(12) United States Patent
Park et al.

(10) Patent No.: US 11,791,670 B2
(45) Date of Patent: Oct. 17, 2023

(54) DEVICE AND METHOD FOR SUPPORTING HETEROGENEOUS COMMUNICATION IN WIRELESS POWER TRANSFER SYSTEM

(71) Applicant: LG ELECTRONICS INC., Seoul (KR)

(72) Inventors: Joonho Park, Seoul (KR); Jinkwon Lim, Seoul (KR); Jingu Choi, Seoul (KR); Yongcheol Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/986,595

(22) Filed: Nov. 14, 2022

(65) Prior Publication Data

US 2023/0084965 A1 Mar. 16, 2023

Related U.S. Application Data

(63) Continuation of application No. 17/423,844, filed as application No. PCT/KR2019/015332 on Nov. 12, 2019, now Pat. No. 11,527,924.

(30) Foreign Application Priority Data

Jan. 21, 2019 (KR) .................. 10-2019-0007470
Apr. 2, 2019 (KR) .................. 10-2019-0038412

(51) Int. Cl.
*H02J 50/80* (2016.01)
*H02J 50/10* (2016.01)
*H02J 7/00* (2006.01)

(52) U.S. Cl.
CPC .......... *H02J 50/80* (2016.02); *H02J 7/00034* (2020.01); *H02J 7/00045* (2020.01); *H02J 50/10* (2016.02)

(58) Field of Classification Search
CPC ........ H02J 50/80; H02J 50/10; H02J 7/00045; H02J 7/00034
(Continued)

(56) References Cited

U.S. PATENT DOCUMENTS 10,484,111 B2   11/2019 Greene et al.
11,119,964 B2    9/2021 Miyaoka et al.
(Continued)

FOREIGN PATENT DOCUMENTS

JP   2018191359    11/2018
KR   1020130043829   5/2013
(Continued)

OTHER PUBLICATIONS

United States Patent and Trademark Office U.S. Appl. No. 17/423,844, Notice of Allowance dated Apr. 14, 2022, 13 pages.
(Continued)

*Primary Examiner* — Alfonso Perez Borroto
(74) *Attorney, Agent, or Firm* — LEE, HONG, DEGERMAN, KANG & WAIMEY PC

(57) ABSTRACT

The present specification relates to a device and method for supporting heterogeneous communication in a wireless power transfer system. The present specification discloses a wireless power reception device comprising: a power pickup circuit configured to receive, from a wireless power transfer device, wireless power generated on the basis of magnetic coupling in a power transfer phase; and a communication and control circuit configured to transmit, to the wireless power transfer device, a first random address packet including a random address of the wireless power reception device or receive, from the wireless power transfer device, a second random address packet including a random address of the wireless power transfer device via in-band communication. By performing a handover using a random address, cross (Continued)

reference can be prevented and security can be enhanced, and thus a BLE connection in a wireless charging system can be more safely performed.

13 Claims, 25 Drawing Sheets

(58) Field of Classification Search
USPC .......................................................... 307/149
See application file for complete search history.

(56) References Cited

U.S. PATENT DOCUMENTS

| | | |
|---|---|---|
| 11,211,830 B2 | 12/2021 | Zeine et al. |
| 2016/0087476 A1* | 3/2016 | Carobolante ........ H04B 5/0037 320/108 |
| 2016/0380439 A1 | 12/2016 | Shao et al. |
| 2017/0223637 A1* | 8/2017 | Wang .................. H04W 52/228 |
| 2017/0229925 A1* | 8/2017 | Shirani-Mehr ......... H02J 50/12 |
| 2022/0085667 A1 | 3/2022 | Park et al. |

FOREIGN PATENT DOCUMENTS

| | | |
|---|---|---|
| KR | 1020160125048 | 10/2016 |
| KR | 1020160125636 | 11/2016 |

OTHER PUBLICATIONS

United States Patent and Trademark Office U.S. Appl. No. 17/423,844, Notice of Allowance dated Jul. 27, 2022, 14 pages.
PCT International Application No. PCT/KR2019/015332 International Search Report dated Feb. 21, 2020, 4 pages.

* cited by examiner

FIG. 3B

|  | b7 | b6 | b5 | b4 | b3 | b2 | b1 | b0 |
|---|---|---|---|---|---|---|---|---|
| Byte 0 | Application Profile ||||||||
| Byte 1 | Version ||||||||
| Byte 2-N-1 | Profile-specific data ||||||||

FIG. 10

| Preamble | ZERO | Response | Type | Info | Parity |

Response
'00' : no comms
'01' : comms error
'10' : NAK
'11' : ACK

Type
ZERO : slot sync
ONE : frame sync

Parity : odd

Info (Type is ZERO)
'00' : allocated
'01' : locked
'10' : free
'11' : reserved

Info (Type is ONE)
'00' : slotted
'01' : frees format
'10' : reserved
'11' : reserved <Inband communication packet structure>

DEVICE AND METHOD FOR SUPPORTING HETEROGENEOUS COMMUNICATION IN WIRELESS POWER TRANSFER SYSTEM

CROSS-REFERENCE TO RELATED APPLICATIONS

This application is a continuation of U.S. patent application Ser. No. 17/423,844, filed on Jul. 16, 2021, which is the National Stage filing under 35 U.S.C. 371 of International Application No. PCT/KR2019/015332, filed on Nov. 12, 2019, which claims the benefit of earlier filing date and right of priority to Korean Patent Application Nos. 10-2019-0007470, filed on Jan. 21, 2019, and 10-2019-0038412, filed on Apr. 2, 2019, the contents of which are all incorporated by reference herein in their entirety.

BACKGROUND OF THE DISCLOSURE

Field of the Disclosure

The present disclosure relates to a wireless power transmission system and, more specifically, to an apparatus and method for supporting heterogeneous communication in a wireless power transmission system.

Related Art

Wireless power transmission technology is a technology for wirelessly transmitting power between a power source and an electronic device. For example, according to the wireless power transmission technology, a battery of a wireless terminal such as a smartphone or a tablet can be charged simply by putting the wireless terminal on a wireless charging pad, and thus, higher mobility, convenience, and stability than those in a conventional wired charging environment using a wired charging connector can be provided. The wireless power transmission technology is receiving attention as a technology that will replace the conventional wired power transmission environment in various fields such as electric vehicles, various wearable devices such as Bluetooth earphones and 3D glasses, home appliances, furniture, underground facilities, buildings, medical devices, robots, and leisure in addition to wireless charging of wireless terminals.

Wireless power transmission is also called contactless power transmission, no point of contact power transmission, or wireless charging. A wireless power transmission system may include a wireless power transmitter that supplies electric energy through wireless power transmission and a wireless power receiver that receives the electric energy wirelessly supplied from the wireless power transmitter and supplies power to a power-receiving device such as a battery cell.

The wireless power transmission technology includes various methods such as a method of transmitting power through magnetic coupling, a method of transmitting power through a radio frequency (RF), a method of transmitting power through microwaves, and a method of transmitting power through ultrasonic waves. Methods based on magnetic coupling are classified into magnetic induction and magnetic resonance. Magnetic induction is a method of transmitting energy using current induced to a coil of a reception side due to magnetic fields generated in a coil battery cell of a transmission side according to electromagnetic coupling of a coil of the transmission side and the coil of the reception side. Magnetic resonance is similar to magnetic induction in that magnetic fields are used. However, magnetic resonance differs from magnetic induction in that resonance occurs when a specific resonance frequency is applied to a coil of a transmission side and a coil of a reception side, and thus, energy is transmitted according to a phenomenon that magnetic fields are concentrated on both ends of the transmission side and the reception side.

In a conventional wireless power transmission system, amplitude shift keying (ASK) using magnetic field variation or frequency shift keying (FSK) using frequency variation is generally used for communication between a wireless power transmitter and a wireless power receiver. However, since ASK and FSK have transmission speeds of only several kHz and are vulnerable to electronic and magnetic disturbances, conventional communication methods are not suitable for middle-level power transmission required in evolved wireless power transmission systems or transmission of large-capacity data such as authentication.

Accordingly, there is a need for a method by which various communication protocols can be selected between a wireless power transmitter and a wireless power receiver in order to support various applications of wireless power transmission.

SUMMARY OF THE DISCLOSURE

A technical object of the present disclosure is to provide an apparatus and method for supporting heterogeneous communication in a wireless power transmission system.

Another technical object of the present disclosure is to provide a device and method for performing handover between heterogenous communication methods in a wireless power transfer system.

Yet another technical object of the present disclosure is to provide an advertising device and method for switching communication methods in a wireless charging system.

Further another technical object of the present disclosure is to provide a packet structure and a procedure for supporting heterogeneous communication methods in a wireless power transmission system.

In order to achieve the above-described object, according to an aspect of the present disclosure, provided herein is a wireless power receiving device supporting heterogeneous communication. The device may include a power pick-up circuit being configured to receive wireless power from a power transferring device via magnetic coupling with the wireless power transferring device in an operating frequency and to convert an alternating current signal being generated by the wireless power to a direct current signal, a communication/control circuit being configured to be supplied with the direct current signal from the power pick-up circuit and to perform communication with the wireless power transferring device, and a load being configured to be supplied with the direct current signal from the power pick-up circuit. Herein, the communication/control circuit may communicate with the wireless power transferring device by using at least one of in-band communication using the operating frequency and out-of-band communication using frequency other than the operating frequency, the communication/control circuit may transfer a first random address packet including a random address of the wireless power receiving device to the wireless power transferring device via in-band communication or receive a second random address packet including a random address of the wireless power transferring device from the wireless power transferring device via in-band communication, and, before the power pick-up circuit enters a power transfer phase receiving the wireless power, the communication/control circuit may be configured to perform a handover procedure to the out-of-band by using at least one of the random address of the wireless power receiving device and the random address of the wireless power transferring device.

A random address of the wireless power receiving device or the wireless power transferring device may be renewed at each out-of-band connection.

The transfer procedure of the first random address packet may be performed by transferring the first random address packet to the wireless power transferring device, and by receiving a response packet corresponding to the first random address packet reception from the wireless power transferring device, and, after transferring the first random address packet, base on that the response packet is not received after a threshold period of time, the handover procedure may not be performed, and the first random address packet may be retransferred to the wireless power transferring device.

The first random address packet or the second random address packet may be configured to have a structure including a 6-byte random address field.

The communication/control circuit may include an in-band communication module and an out-of-band communication module. Herein, based on that the handover procedure is completed, the out-of-band communication module may perform a pairing procedure for an out-of-band connection with the wireless power transferring device, by using at least one of a random address of the wireless power receiving device and a random address of the wireless power transferring device.

During the pairing procedure, an advertising packet including an advertiser address may be transferred to the wireless power transferring device or received from the wireless power transferring device. Herein, the advertiser may be the wireless power transferring device or the wireless power receiving device, and the advertiser address may include a random address.

After receiving the advertising packet, the out-of-band communication module may perform an initiating connection procedure. Herein, during the initiating connection procedure, the out-of-band communication module may receive the advertising packet and request a connection with the wireless power transferring device, and, when requesting a connection with the wireless power transferring device, a frequency hopping sequence of the wireless power receiving device may be transferred after including frequency hopping channel map information to the frequency hopping sequence, so as to establish synchronization with the wireless power transferring device.

The advertising procedure and the initiating connection procedure may be performed by a link layer.

The advertising packet may be configured of a preamble, an access address field, a Packet Data Unit (PDU) field, and a Cyclic Redundancy Check (CRC). Herein, the PDU field may include a header and a payload, the header may include advertising type information, and the payload may include the advertiser address.

(i) In case an address between the wireless power receiving device and the wireless power transferring device is known via in-band communication, the advertising type information may be configured as a connectable directed advertisement event (ADV_DIRECT_IND), and the advertiser address and a target device address may be included in the payload, and (ii) in case an address between the wireless power receiving device and the wireless power transferring device is unknown via in-band communication, the advertising type information may be configured as a connectable undirected advertisement event (ADV_IND), and the advertiser address may be included in the payload.

During the pairing procedure, device filtering may be performed based on a white list, and, herein, the white list may be a certain set of devices.

The white list may be renewed based on a random address.

The device filtering may be performed in at least one of the advertising procedure, the scanning procedure, and the initiating connection procedure.

During the advertising procedure, a link layer of the wireless power receiving device may process scanning and connection requests. Herein, (i) only the scanning and connection requests from a device being included in the white list may be processed, (ii) although the scanning request from all devices is processed, in case of the connection request, only the connection request from devices included in the white list may be processed, or (iii) although the connection request from all devices is processed, in case of the scanning request, only the scanning request from devices included in the white list may be processed.

During the scanning procedure or the initiating connection procedure, a link layer of the wireless power receiving device may process only advertising packets from devices included in the white list.

The communication/control circuit may include an in-band communication module and an out-of-band communication module. Herein, based on that the in-band communication module receives the second random address packet, the in-band communication module may transfer a random address of the wireless power transferring device to the out-of-band communication module, and the out-of-band communication module may renew the white list by using the random address of the wireless power transferring device.

The out-of-band communication module may transfer a response packet to the wireless power transferring device, only in a case where the wireless power transferring device is included in the white list, by using the random address of the wireless power transferring device.

In order to achieve the above-described object, according to another aspect of the present disclosure, provided herein is a method for performing heterogeneous communication, by a wireless power receiving device, the wireless power receiving device being configured to receive wireless power from a wireless power transferring device via magnetic coupling with the wireless power transferring device in an operating frequency. The method may include the steps of, during and identification and configuration phase, transferring a first random address packet including a random address of the wireless power receiving device to the wireless power transferring device via in-band communication using the operating frequency, or receiving a second random address packet including a random address of the wireless power transferring device from the wireless power transferring device via in-band communication, and, before entering a power transfer phase, performing a handover procedure to the out-of-band using a frequency other than the operating frequency, by using at least one of the random address of the wireless power receiving device and the random address of the wireless power transferring device, and, during the power transfer phase, receiving the wireless power.

In order to achieve the above-described object, according to another aspect of the present disclosure, provided herein is a wireless power transferring device supporting heterogeneous communication. The device may include a power conversion circuit transferring wireless power to a wireless power receiving device via magnetic coupling with the wireless power receiving device in an operating frequency, and a communication/control circuit performing at least one of in-band communication using the operating frequency and out-of-band communication using frequency other than the operating frequency. Herein, the communication/control circuit may transfer a first random address packet including a random address of the wireless power transferring device to the wireless power receiving device via in-band communication or receive a second random address packet including a random address of the wireless power receiving device from the wireless power receiving device via in-band communication, and, before the power conversion circuit enters a power transfer phase transferring the wireless power, the communication/control circuit may be configured to perform a handover procedure to the out-of-band by using at least one of the random address of the wireless power transferring device and the random address of the wireless power receiving device.

In order to achieve the above-described object, according to another aspect of the present disclosure, provided herein is a method for performing heterogeneous communication, by a wireless power transferring device, the wireless power transferring device being configured to transfer wireless power to a wireless power receiving device via magnetic coupling with the wireless power receiving device in an operating frequency. The method may include the steps of, during and identification and configuration phase, transferring a first random address packet including a random address of the wireless power transferring device to the wireless power receiving device via in-band communication using the operating frequency, or receiving a second random address packet including a random address of the wireless power receiving device from the wireless power receiving device via in-band communication, and, before entering a power transfer phase, performing a handover procedure to the out-of-band using a frequency other than the operating frequency, by using at least one of the random address of the wireless power transferring device and the random address of the wireless power receiving device, and, during the power transfer phase, transferring the wireless power.

Effects of the Disclosure

According to the present embodiment, by performing handover using a random address, cross reference may be prevented and security may be reinforced. Accordingly, a wireless charging system may perform BLE connection more safely.

BRIEF DESCRIPTION OF THE DRAWINGS

FIG. 3b shows an example of a WPC NDEF in a wireless power transfer system.

FIG. 10 is a structure of a sync pattern according to an exemplary embodiment of the present disclosure.

DESCRIPTION OF EXEMPLARY EMBODIMENTS

The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
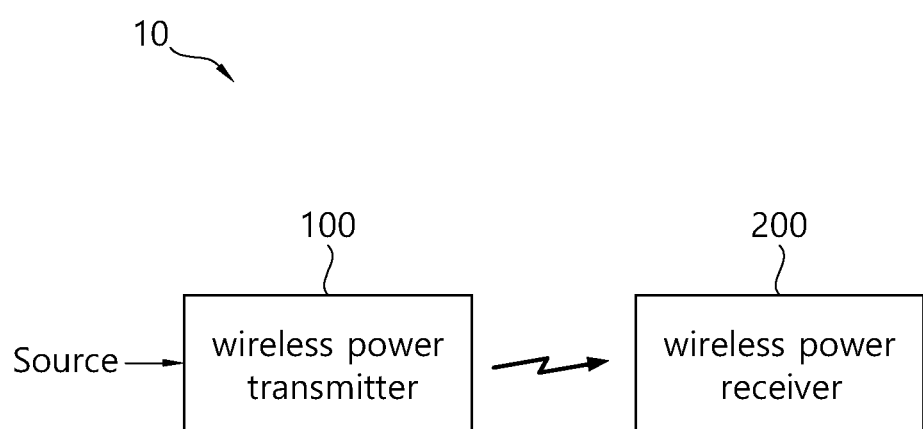
FIG. 1 is a block diagram of a wireless power system according to an exemplary embodiment of the present disclosure.

FIG. 1 is a block diagram of a wireless power system according to an exemplary embodiment of the present disclosure.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth, Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
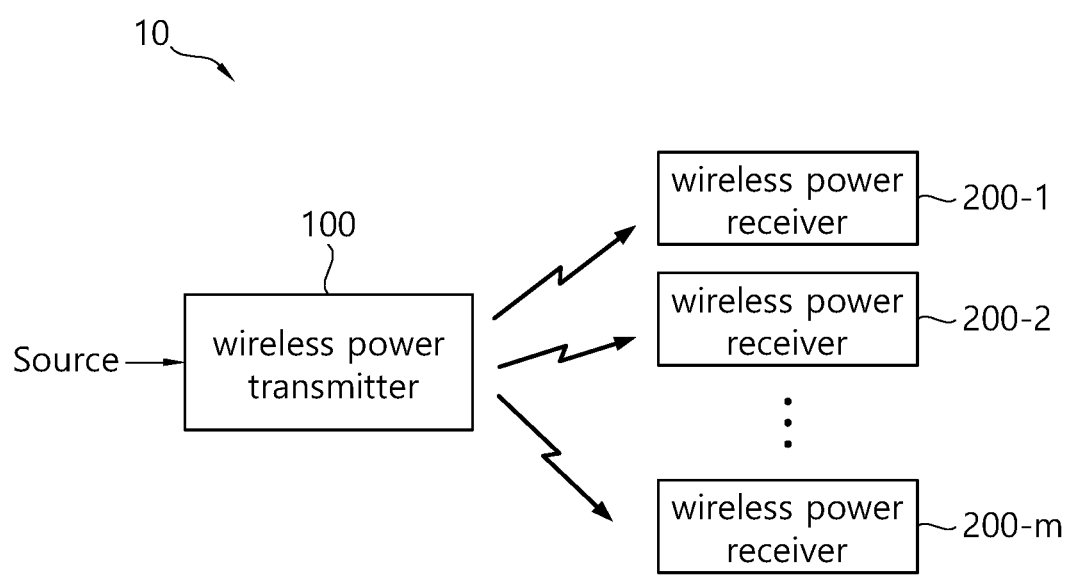
FIG. 2 is a block diagram of a wireless power system according to another exemplary embodiment of the present disclosure.

In the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3A:
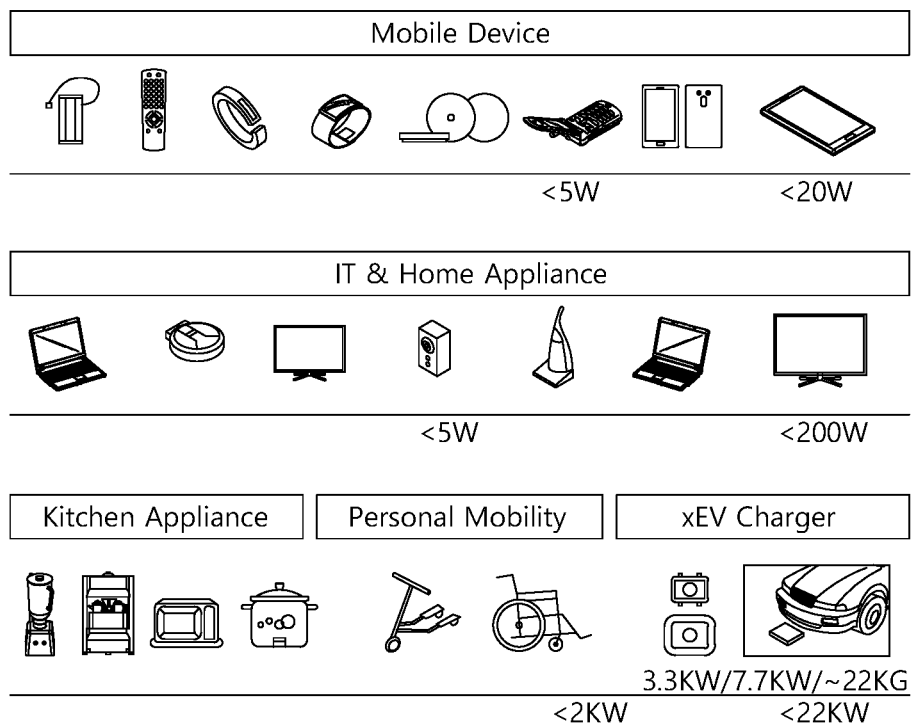
FIG. 3a shows an exemplary embodiment of diverse electronic devices adopting a wireless power transfer system.

FIG. 3a shows an exemplary embodiment of diverse electronic devices adopting a wireless power transfer system.

As shown in FIG. 3a, the electronic devices included in the wireless power transfer system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately SOW or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or re-charged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5 W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OB corresponds to a mandatory communication channel for PC1, and IB is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an over-voltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

As an example, a user may experience a smart wireless charging service in a hotel. When the user enters a hotel room and puts a smartphone on a wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when it is detected that wireless power is received, or when the smartphone receives information on the smart wireless charging service from the wireless charger, the smartphone enters a state of inquiring the user about agreement (opt-in) of supplemental features. To this end, the smartphone may display a message on a screen in a manner with or without an alarm sound. An example of the message may include the phrase "Welcome to ### hotel. Select "Yes" to activate smart charging functions: Yes|No Thanks." The smartphone receives an input from the user who selects Yes or No Thanks, and performs a next procedure selected by the user. If Yes is selected, the smartphone transmits corresponding information to the wireless charger. The smartphone and the wireless charger perform the smart charging function together.

The smart wireless charging service may also include receiving WiFi credentials auto-filled. For example, the wireless charger transmits the WiFi credentials to the smartphone, and the smartphone automatically inputs the WiFi credentials received from the wireless charger by running an appropriate application.

The smart wireless charging service may also include running a hotel application that provides hotel promotions or obtaining remote check-in/check-out and contact information.

As another example, the user may experience the smart wireless charging service in a vehicle. When the user gets in the vehicle and puts the smartphone on the wireless charger, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about checking identity.

In this state, the smartphone is automatically connected to the vehicle via WiFi and/or Bluetooth. The smartphone may display a message on the screen in a manner with or without an alarm sound. An example of the message may include a phrase of "Welcome to your car. Select "Yes" to synch device with in-car controls: Yes|No Thanks." Upon receiving the user's input to select Yes or No Thanks, the smartphone performs a next procedure selected by the user. If Yes is selected, the smartphone transmits corresponding information to the wireless charger. In addition, the smartphone and the wireless charger may run an in-vehicle smart control function together by driving in-vehicle application/display software. The user may enjoy the desired music and check a regular map location. The in-vehicle applications/display software may include an ability to provide synchronous access for passers-by.

As another example, the user may experience smart wireless charging at home. When the user enters the room and puts the smartphone on the wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about agreement (opt-in) of supplemental features. To this end, the smartphone may display a message on the screen in a manner with or without an alarm sound. An example of the message may include a phrase such as "Hi xxx, Would you like to activate night mode and secure the building?: Yes|No Thanks." The smartphone receives a user input to select Yes or No Thanks and performs a next procedure selected by the user. If Yes is selected, the smartphone transmits corresponding information to the wireless charger. The smartphones and the wireless charger may recognize at least user's pattern and recommend the user to lock doors and windows, turn off lights, or set an alarm.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF). For example, the WPC NDEF may include an application profile field (e.g., 1B), a version field (e.g., 1B), and profile specific data (e.g., 1B). The application profile field indicates whether the corresponding device is i) mobile and computing, ii) power tool, and iii) kitchen, and an upper nibble in the version field indicates a major version and a lower nibble indicates a minor version. In addition, profile-specific data defines content for the kitchen.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transfer only to the wireless power receiving corresponding to the same profile as the wireless power transmitter, thereby being capable of performing a more stable power transfer. Additionally, since the load (or burden) of the wireless power transmitter may be reduced and power transfer is not attempted to a wireless power receiver for which compatibility is not possible, the risk of damage in the wireless power receiver may be reduced.

PC1 of the 'Mobile' profile may be defined by being derived from an optional extension, such as OB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| PTU | $P_{TX\_IN\_MAX}$ | Minimum category support requirement | Minimum value for a maximum number of supported devices |
|---|---|---|---|
| Class 1 | 2 W | 1x Category 1 | 1x Category 1 |
| Class 2 | 10 W | 1x Category 3 | 2x Category 2 |
| Class 3 | 16 W | 1x Category 4 | 2x Category 3 |
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | $P_{RX\_OUT\_MAX}$ | Exemplary application |
|---|---|---|
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

As shown in Table 1, a maximum output power capability of Class n PTU may be equal to or greater than the $P_{TX\_IN\_MAX}$ of the corresponding class. The PRU cannot draw a power that is higher than the power level specified in the corresponding category.

Figure 4A:
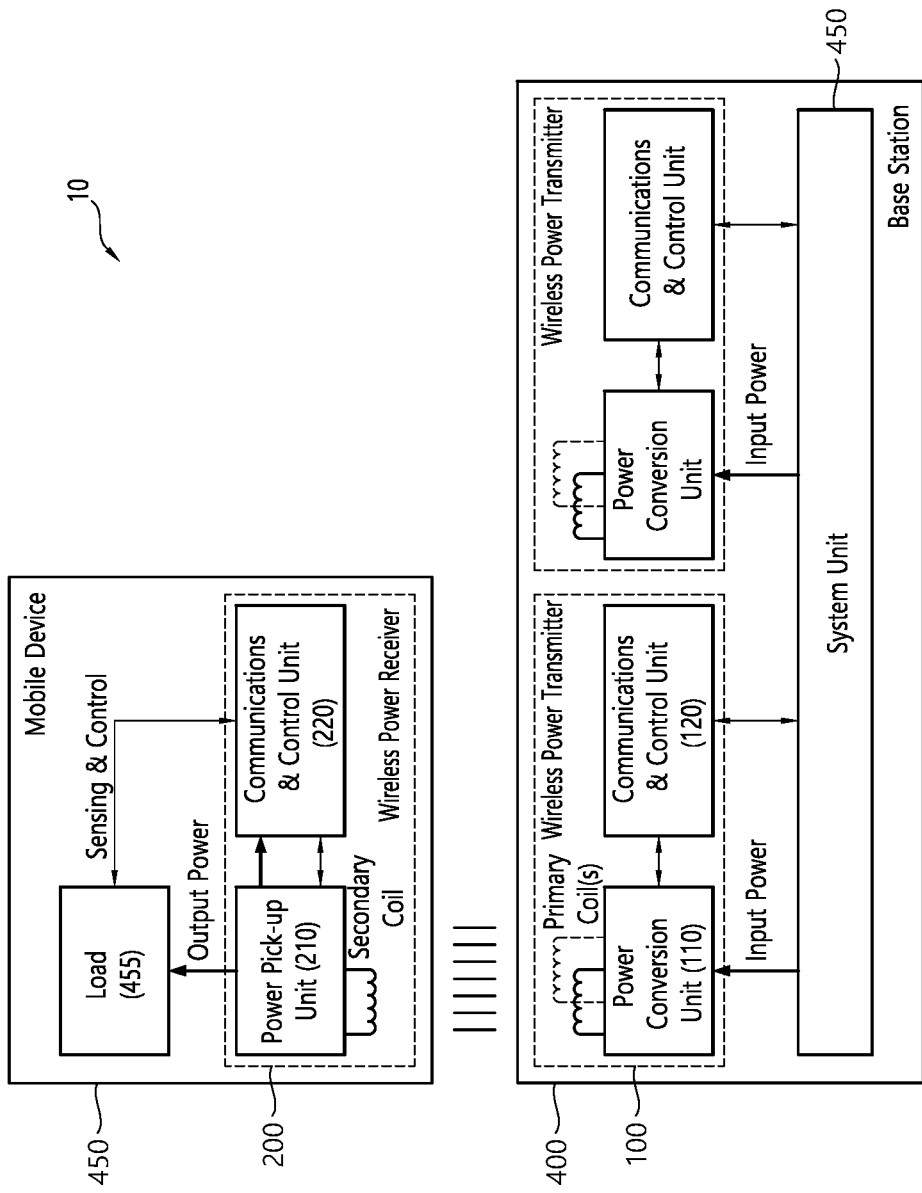
FIG. 4a is a block diagram of a wireless power transfer system according to another exemplary embodiment of the present disclosure.

FIG. 4a is a block diagram of a wireless power transfer system according to another exemplary embodiment of the present disclosure.

Referring to FIG. 4a, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system circuit (405). The wireless power transmitter (100) may transmit induction power or resonance power and may control the transmission. The wireless power transmitter (100) may include a power conversion circuit (110) converting electric energy to a power signal by generating a magnetic field through a primary coil (or primary coils), and a communications & control circuit (120) controlling the communication and power transfer between the wireless power receiver (200) in order to transfer power at an appropriate (or suitable) level. The system circuit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion circuit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control circuit (120) may transmit and/or receive information to and from the wireless power receiver (200). The communications & control circuit (120) may include at least one of an TB communication module and an OB communication module.

The TB communication module may transmit and/or receive information by using a magnetic wave, which uses a specific frequency as its center frequency. For example, the communications & control circuit (120) may perform in-band (IB) communication by transmitting communication information on the operating frequency of wireless power transfer through the primary coil or by receiving communication information on the operating frequency through the primary coil. At this point, the communications & control circuit (120) may load information in the magnetic wave or may interpret the information that is carried by the magnetic wave by using a modulation scheme, such as binary phase shift keying (BPSK) or amplitude shift keying (ASK), and so on, or a coding scheme, such as Manchester coding or non-return-to-zero level (NZR-L) coding, and so on. By using the above-described IB communication, the communications & control circuit (120) may transmit and/or receive information to distances of up to several meters at a data transmission rate of several kbps.

The OB communication module may perform out-of-band communication through a communication antenna. For example, the communications & control circuit (120) may be provided to a near field communication module. Examples of the near field communication module may include communication modules, such as Wi-Fi, Bluetooth, Bluetooth LE, ZigBee, NFC, and so on.

The communications & control circuit (120) may control the overall operations of the wireless power transmitter (100). The communications & control circuit (120) may perform calculation and processing of diverse information and may also control each configuration element of the wireless power transmitter (100).

The communications & control circuit (120) may be implemented in a computer or a similar device as hardware, software, or a combination of the same. When implemented in the form of hardware, the communications & control circuit (120) may be provided as an electronic circuit performing control functions by processing electrical signals. And, when implemented in the form of software, the communications & control circuit (120) may be provided as a program that operates the communications & control circuit (120).

By controlling the operating point, the communications & control circuit (120) may control the transmitted power. The operating point that is being controlled may correspond to a combination of a frequency (or phase), a duty cycle, a duty ratio, and a voltage amplitude. The communications & control circuit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up circuit (210) and a communications & control circuit (220). The power pick-up circuit (210) may receive wireless power through the secondary coil and may convert the received wireless power to electric energy. The power pick-up circuit (210) rectifies the alternating current (AC) signal, which is received through the secondary coil, and converts the rectified signal to a direct current (DC) signal. The communications & control circuit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 4a, the communications & control circuit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control circuit (220) may transmit and/or receive information to and from the wireless power transmitter (100). The communications & control circuit (220) may include at least one of an IB communication module and an OB communication module.

The IB communication module may transmit and/or receive information by using a magnetic wave, which uses a specific frequency as its center frequency. For example, the communications & control circuit (220) may perform IB communication by loading information in the magnetic wave and by transmitting the information through the secondary coil or by receiving the magnetic wave carrying the information through the secondary coil. At this point, the communications & control circuit (120) may load information in the magnetic wave or may interpret the information that is carried by the magnetic wave by using a modulation scheme, such as binary phase shift keying (BPSK) or amplitude shift keying (ASK), and so on, or a coding scheme, such as Manchester coding or non-return-to-zero level (NZR-L) coding, and so on. By using the above-described IB communication, the communications & control circuit (220) may transmit and/or receive information to distances of up to several meters at a data transmission rate of several kbps.

The OB communication module may perform out-of-band communication through a communication antenna. For example, the communications & control circuit (220) may be provided to a near field communication module.

Examples of the near field communication module may include communication modules, such as Wi-Fi, Bluetooth, Bluetooth LE, ZigBee, NFC, and so on.

The communications & control circuit (220) may control the overall operations of the wireless power receiver (200). The communications & control circuit (220) may perform calculation and processing of diverse information and may also control each configuration element of the wireless power receiver (200).

The communications & control circuit (220) may be implemented in a computer or a similar device as hardware, software, or a combination of the same. When implemented in the form of hardware, the communications & control circuit (220) may be provided as an electronic circuit performing control functions by processing electrical signals. And, when implemented in the form of software, the communications & control circuit (220) may be provided as a program that operates the communications & control circuit (220).

Figure 4B:
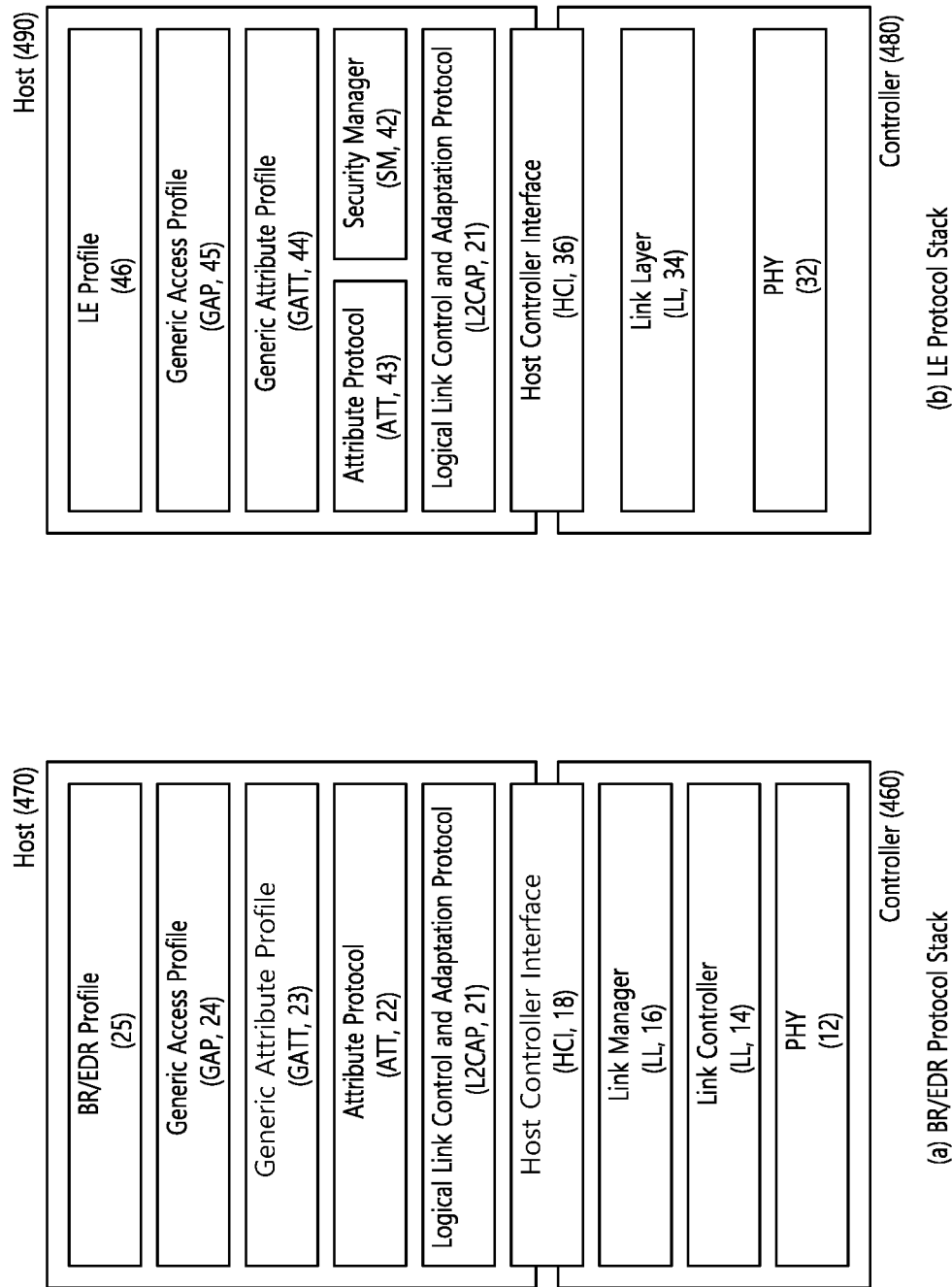
FIG. 4b is a conceptual diagram illustrating an example of a Bluetooth communication architecture to which an embodiment according to the present disclosure may be applied.

When the communication/control circuit 120 and the communication/control circuit 220 are Bluetooth or Bluetooth LE as an OB communication module or a short-range communication module, the communication/control circuit 120 and the communication/control circuit 220 may each be implemented and operated with a communication architecture as shown in FIG. 4B.

FIG. 4B is a diagram illustrating an example of a Bluetooth communication architecture to which an embodiment according to the present disclosure may be applied.

Referring to FIG. 4B, (a) of FIG. 4B shows an example of a protocol stack of Bluetooth basic rate (BR)/enhanced data rate (EDR) supporting GATT, and (b) shows an example of Bluetooth low energy (BLE) protocol stack.

Specifically, as shown in (a) of FIG. 4B, the Bluetooth BR/EDR protocol stack may include an upper control stack 460 and a lower host stack 470 based on a host controller interface (HCI) 18.

The host stack (or host module) 470 refers to hardware for transmitting or receiving a Bluetooth packet to or from a wireless transmission/reception module which receives a Bluetooth signal of 2.4 GHz, and the controller stack 460 is connected to the Bluetooth module to control the Bluetooth module and perform an operation.

The host stack 470 may include a BR/EDR PHY layer 12, a BR/EDR baseband layer 14, and a link manager layer 16.

The BR/EDR PHY layer 12 is a layer that transmits and receives a 2.4 GHz radio signal, and in the case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence for hopping 1400 times per second, and transmits a time slot with a length of 625 us for each channel.

The link manager layer 16 controls an overall operation (link setup, control, security) of Bluetooth connection by utilizing a link manager protocol (LMP).

The link manager layer 16 may perform the following functions.

Performs ACL/SCO logical transport, logical link setup, and control.

Detach: It interrupts connection and informs a counterpart device about a reason for the interruption.

Performs power control and role switch.

Performs security (authentication, pairing, encryption) function.

The host controller interface layer 18 provides an interface between a host module and a controller module so that a host provides commands and data to the controller and the controller provides events and data to the host.

The host stack (or host module, 470) includes a logical link control and adaptation protocol (L2CAP) 21, an attribute protocol 22, a generic attribute profile (GATT) 23, a generic access profile (GAP) 24, and a BR/EDR profile 25.

The logical link control and adaptation protocol (L2CAP) 21 may provide one bidirectional channel for transmitting data to a specific protocol or profile.

The L2CAP 21 may multiplex various protocols, profiles, etc., provided from upper Bluetooth.

L2CAP of Bluetooth BR/EDR uses dynamic channels, supports protocol service multiplexer, retransmission, streaming mode, and provides segmentation and reassembly, per-channel flow control, and error control.

The generic attribute profile (GATT) 23 may be operable as a protocol that describes how the attribute protocol 22 is used when services are configured. For example, the generic attribute profile 23 may be operable to specify how ATT attributes are grouped together into services and may be operable to describe features associated with services.

Accordingly, the generic attribute profile 23 and the attribute protocols (ATT) 22 may use features to describe device's state and services, how features are related to each other, and how they are used.

The attribute protocol 22 and the BR/EDR profile 25 define a service (profile) using Bluetooth BR/EDR and an application protocol for exchanging these data, and the generic access profile (GAP) 24 defines device discovery, connectivity, and security level.

As shown in (b) of FIG. 4B, the Bluetooth LE protocol stack includes a controller stack 480 operable to process a wireless device interface important in timing and a host stack 490 operable to process high level data.

First, the controller stack 480 may be implemented using a communication module that may include a Bluetooth wireless device, for example, a processor module that may include a processing device such as a microprocessor.

The host stack 490 may be implemented as a part of an OS running on a processor module or as an instantiation of a package on the OS.

In some cases, the controller stack and the host stack may be run or executed on the same processing device in a processor module.

The controller stack 480 includes a physical layer (PHY) 32, a link layer 34, and a host controller interface 36.

The physical layer (PHY, wireless transmission/reception module) 32 is a layer that transmits and receives a 2.4 GHz radio signal and uses Gaussian frequency shift keying (GFSK) modulation and a frequency hopping scheme including 40 RF channels.

The link layer 34, which serves to transmit or receive Bluetooth packets, creates connections between devices after performing advertising and scanning functions using 3 advertising channels and provides a function of exchanging data packets of up to 257 bytes through 37 data channels.

The host stack includes a generic access profile (GAP) 45, a logical link control and adaptation protocol (L2CAP, 41), a security manager (SM) 42, and an attribute protocol (ATT) 43, a generic attribute profile (GATT) 44, a generic access profile 45, and an LE profile 46. However, the host stack 490 is not limited thereto and may include various protocols and profiles.

The host stack multiplexes various protocols, profiles, etc., provided from upper Bluetooth using L2CAP.

First, the logical link control and adaptation protocol (L2CAP) 41 may provide one bidirectional channel for transmitting data to a specific protocol or profile.

The L2CAP 41 may be operable to multiplex data between higher layer protocols, segment and reassemble packages, and manage multicast data transmission.

In Bluetooth LE, three fixed channels (one for signaling CH, one for security manager, and one for attribute protocol) are basically used. Also, a dynamic channel may be used as needed.

Meanwhile, a basic channel/enhanced data rate (BR/EDR) uses a dynamic channel and supports protocol service multiplexer, retransmission, streaming mode, and the like.

The security manager (SM) 42 is a protocol for authenticating devices and providing key distribution.

The attribute protocol (ATT) 43 defines a rule for accessing data of a counterpart device in a server-client structure.

The ATT has the following 6 message types (request, response, command, notification, indication, confirmation).

① Request and Response message: A request message is a message for requesting specific information from the client device to the server device, and the response message is a response message to the request message, which is a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present disclosure, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

① Battery: Battery information exchanging method

② Time: Time information exchanging method

③ FindMe: Provision of alarm service according to distance

④ Proximity: Battery information exchanging method

⑤ Time: Time information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertising event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an supplemental information request or a connection request.

In contrast, directed advertising may make an supplemental information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertising events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related supplemental information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ_PDU to the advertising device or when the advertising device receives a CONNECT_REQ_PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 3 below.

TABLE 3

| PDU Type | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in the present disclosure.

Referring to FIG. 4a, The load (455) may correspond to a battery. The battery may store energy by using the power that is being outputted from the power pick-up circuit (210). Meanwhile, the battery is not mandatorily required to be included in the mobile device (450). For example, the battery may be provided as a detachable external feature. As another example, the wireless power receiver may include an operating means that may execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Figure 4C:
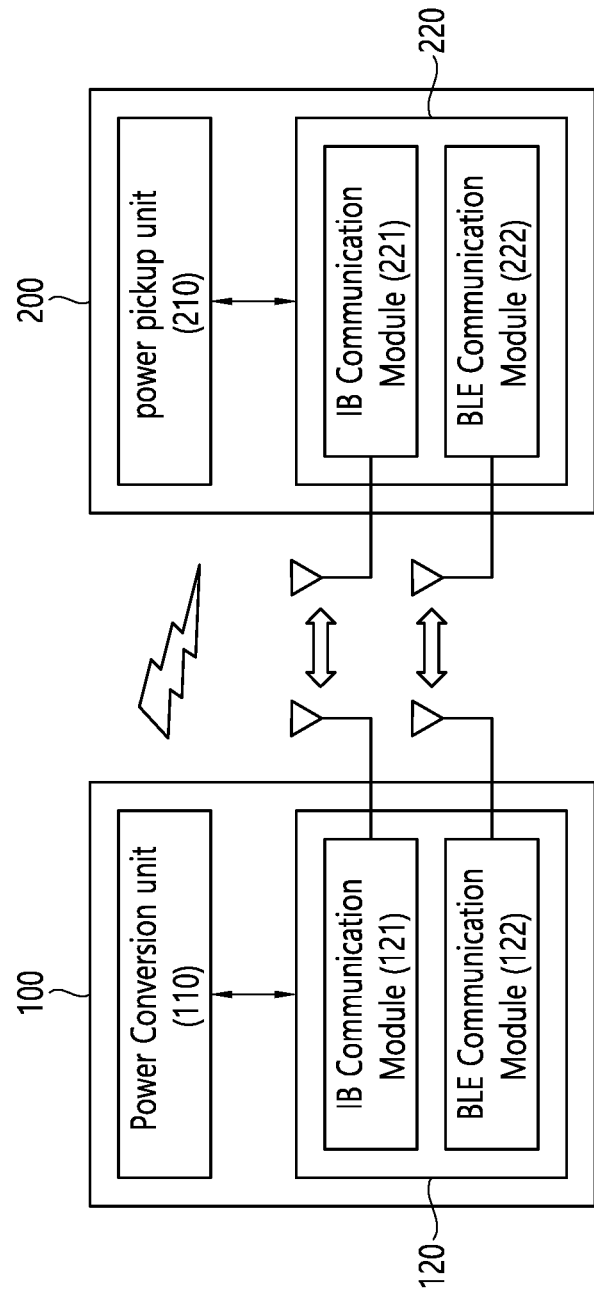
FIG. 4c is a block diagram illustrating a wireless power transfer system using BLE communication according to an example.

When the communication/control circuit 120 and the communication/control circuit 220 include Bluetooth or Bluetooth LE as an OB communication module or a short-range communication module in addition to the IB communication module, the wireless power transmitter 100 including the communication/control circuit 120 and the wireless power receiver 200 including the communication/control circuit 220 may be represented by a simplified block diagram as shown in FIG. 4C.

FIG. 4C is a block diagram illustrating a wireless power transfer system using BLE communication according to an example.

Referring to FIG. 4C, the wireless power transmitter 100 includes a power conversion circuit 110 and a communication/control circuit 120. The communication/control circuit 120 includes an in-band communication module 121 and a BLE communication module 122.

Meanwhile, the wireless power receiver 200 includes a power pickup circuit 210 and a communication/control circuit 220. The communication/control circuit 220 includes an in-band communication module 221 and a BLE communication module 222.

In one aspect, the BLE communication modules 122 and 222 perform the architecture and operation according to FIG. 4B. For example, the BLE communication modules 122 and 222 may be used to establish a connection between the wireless power transmitter 100 and the wireless power receiver 200 and exchange control information and packets necessary for wireless power transfer.

In another aspect, the communication/control circuit 120 may be configured to operate a profile for wireless charging. Here, the profile for wireless charging may be GATT using BLE transmission.

Figure 4D:
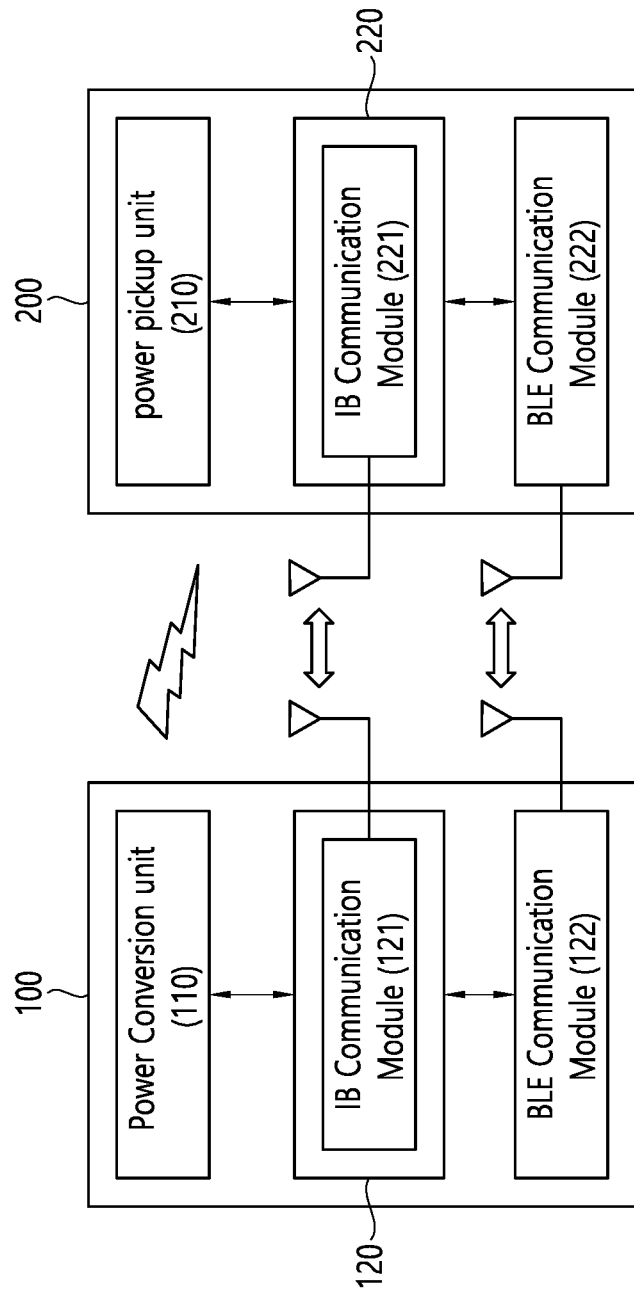
FIG. 4d is a block diagram illustrating a wireless power transfer system using BLE communication according to another example.

Referring to FIG. 4D, the communication/control circuits 120 and 220 respectively include only in-band communication modules 121 and 221, and the BLE communication modules 122 and 222 may be provided to be separated from the communication/control circuits 120 and 220.

Hereinafter, the coil or coil unit includes a coil and at least one device being approximate to the coil, and the coil or coil unit may also be referred to as a coil assembly, a coil cell, or a cell.

Figure 5:
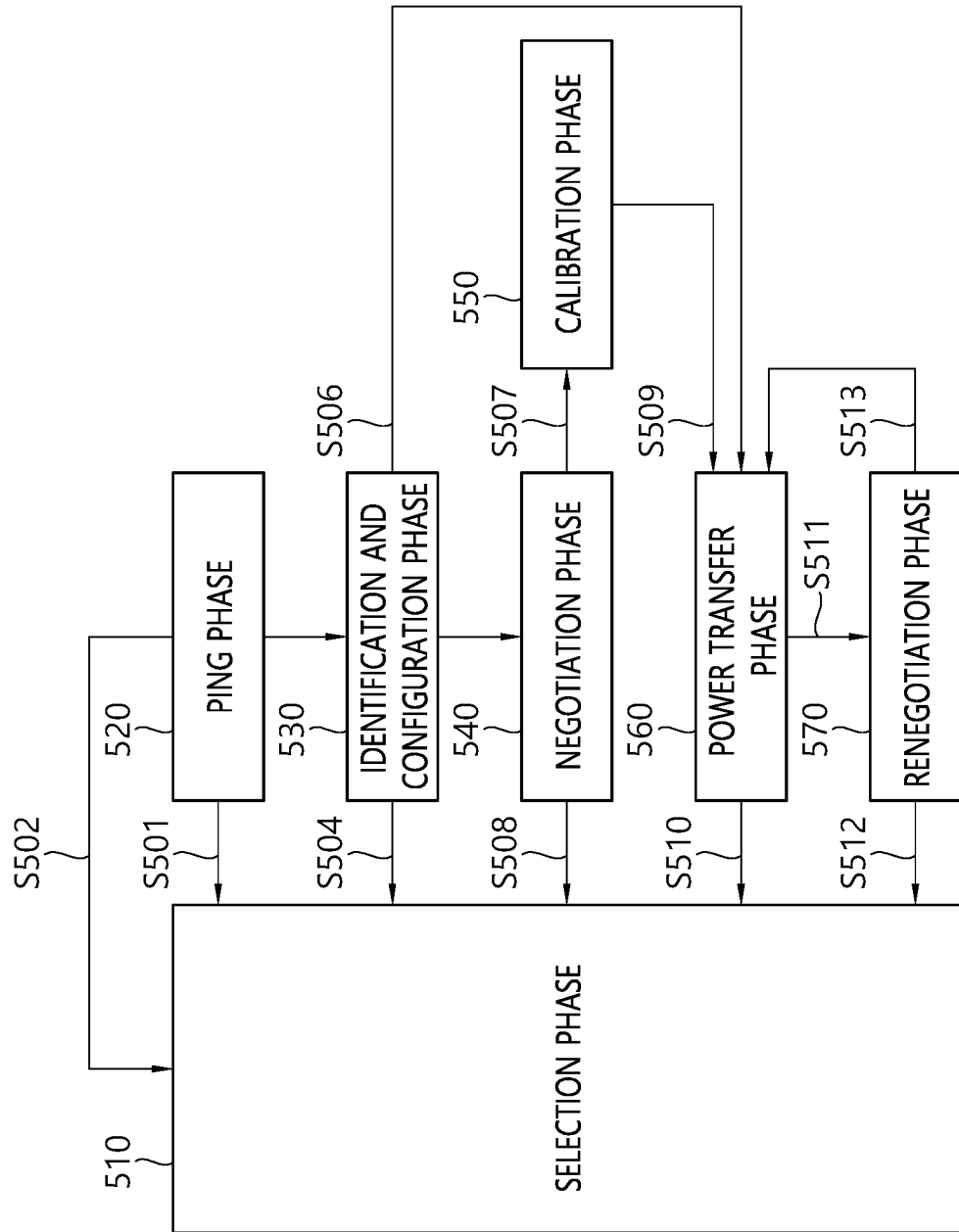
FIG. 5 is a state transition diagram for describing a wireless power transfer procedure.

FIG. 5 is a state transition diagram for describing a wireless power transfer procedure.

Referring to FIG. 5, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)—reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having a power signal (or a pulse) corresponding to an extremely short duration, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

In this embodiment, the calibration step 550 and the power transfer phase 560 are divided into separate steps, but the calibration step 550 may be integrated into the power transfer phase 560. In this case, operations in the calibration step 550 may be performed in the power transfer phase 560.

The above-described power transfer contract may be configured based on the status and characteristic information of the wireless power transmitter and receiver. For example, the wireless power transmitter status information may include information on a maximum amount of transmittable power, information on a maximum number of receivers that may be accommodated, and so on. And, the receiver status information may include information on the required power, and so on.

Figure 6:
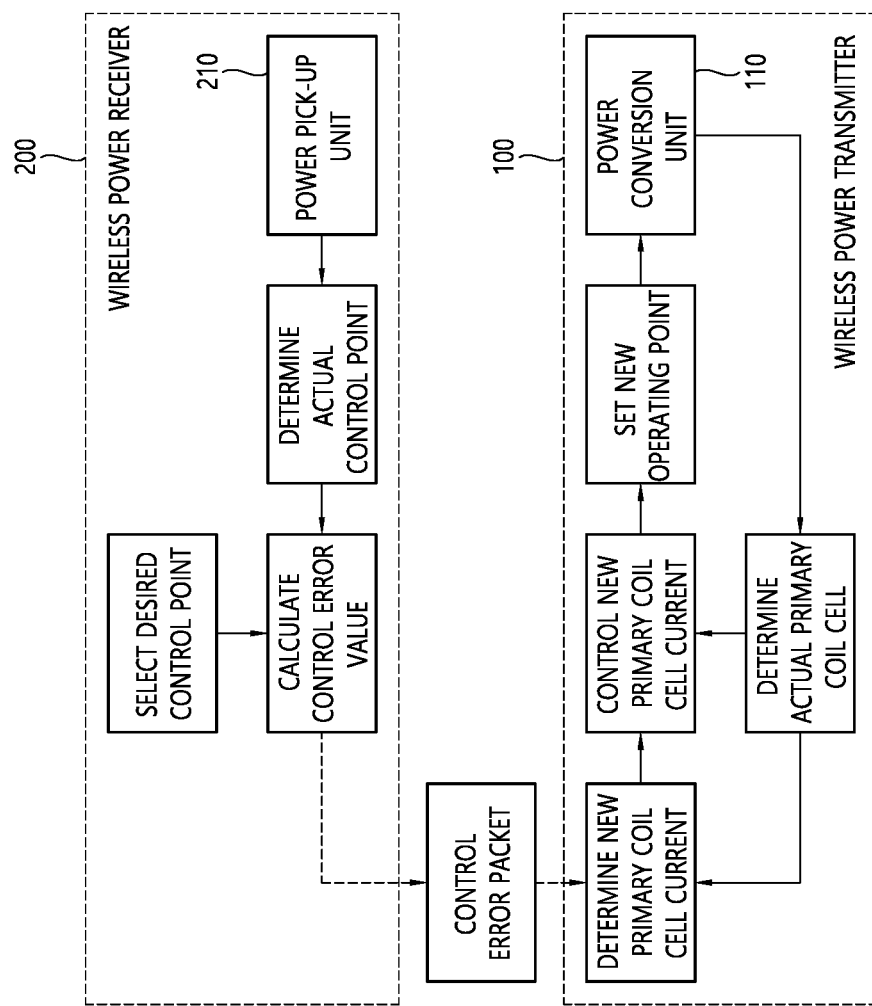
FIG. 6 shows a power control method according to an exemplary embodiment of the present disclosure.

FIG. 6 shows a power control method according to an exemplary embodiment of the present disclosure.

As shown in FIG. 6, in the power transfer phase (560), by alternating the power transfer and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point—amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 6 will not be completely excluded. And, additional control of the transmitted power may be performed by using the method of FIG. 6.

Figure 7:
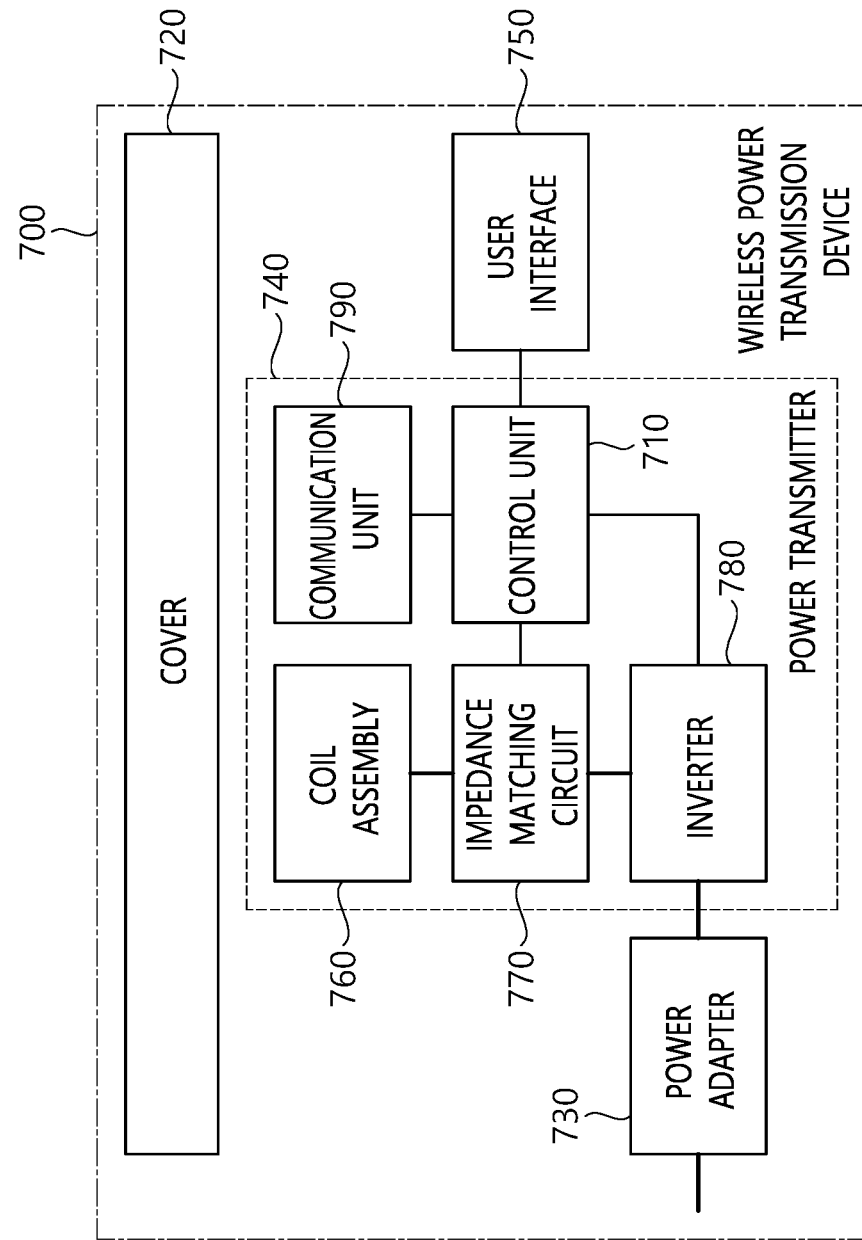
FIG. 7 is a block diagram of a wireless power transmitter according to another exemplary embodiment of the present disclosure.

FIG. 7 is a block diagram of a wireless power transmitter according to another exemplary embodiment of the present disclosure. This may belong to a wireless power transfer system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 7, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication circuit (790), and a control circuit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication circuit (790) may perform communication with the power receiver. The power receiver performs load modulation in order to communicate requests and information corresponding to the power transmitter. Therefore, the power transmitter (740) may use the communication circuit (790) so as to monitor the amplitude and/or phase of the electric current and/or voltage of the primary coil in order to demodulate the data being transmitted from the power receiver.

Additionally, the power transmitter (740) may control the output power to that the data may be transferred through the communication circuit (790) by using a Frequency Shift Keying (FSK) method, and so on.

The control circuit (710) may control communication and power transfer (or delivery) of the power transmitter (740). The control circuit (710) may control the power transfer by adjusting the above-described operating point. The operating point may be determined by, for example, at least any one of the operation frequency, the duty cycle, and the input voltage.

The communication circuit (790) and the control circuit (710) may each be provided as a separate unit/device/chipset or may be collectively provided as one unit/device/chipset.

Figure 8:
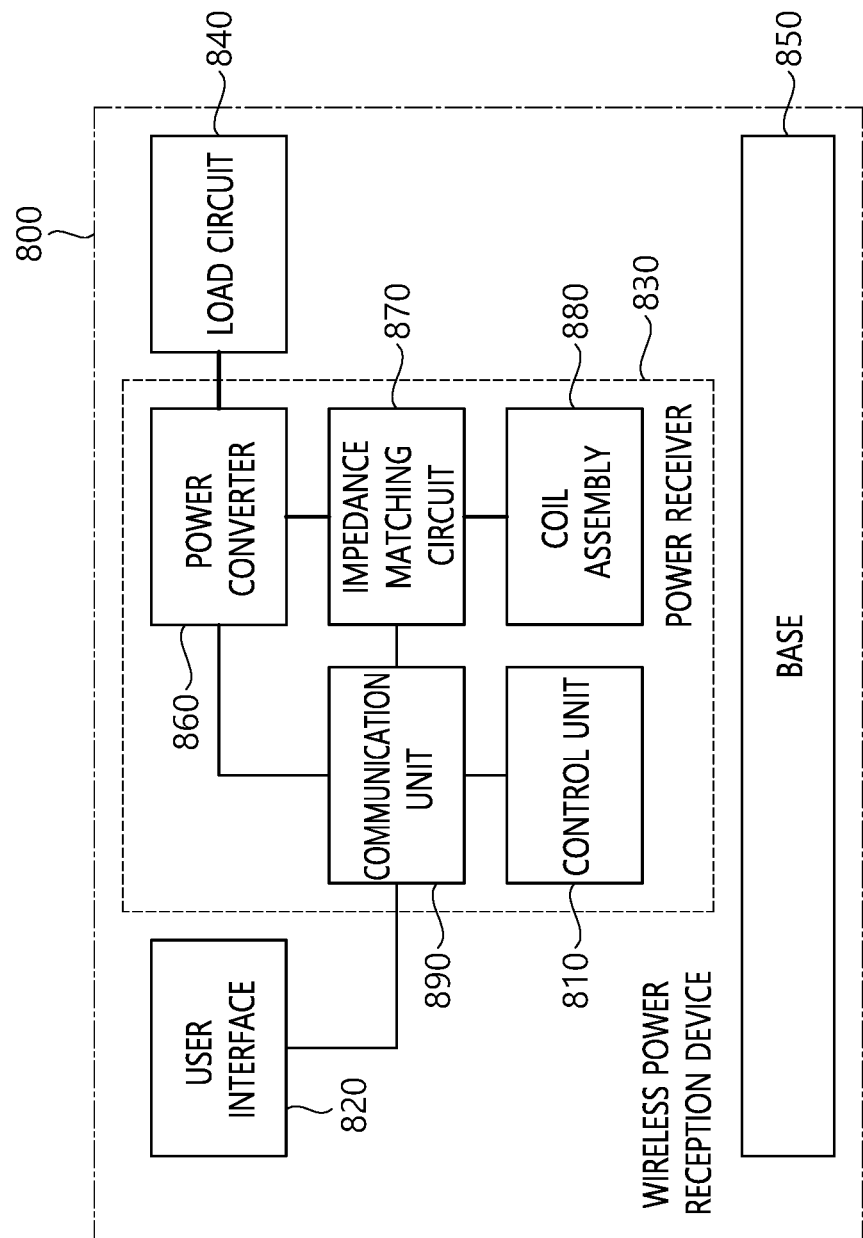
FIG. 8 shows a wireless power receiver according to another exemplary embodiment of the present disclosure.

FIG. 8 shows a wireless power receiver according to another exemplary embodiment of the present disclosure. This may belong to a wireless power transfer system that is being operated in the magnetic resonance mode or the shared mode.

Referring to FIG. 8, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication circuit (890), and a control circuit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which may reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication circuit (890) may perform load modulation in order to communicate requests and other information to the power transmitter.

For this, the power receiver (830) may perform switching of the resistance or capacitor so as to change the reflected impedance.

The control circuit (810) may control the received power. For this, the control circuit (810) may determine/calculate a difference between an actual operating point and a target operating point of the power receiver (830). Thereafter, by performing a request for adjusting the reflected impedance of the power transmitter and/or for adjusting an operating point of the power transmitter, the difference between the actual operating point and the target operating point may be adjusted/reduced. In case of minimizing this difference, an optimal power reception may be performed.

The communication circuit (890) and the control circuit (810) may each be provided as a separate device/chipset or may be collectively provided as one device/chipset.

Figure 9:
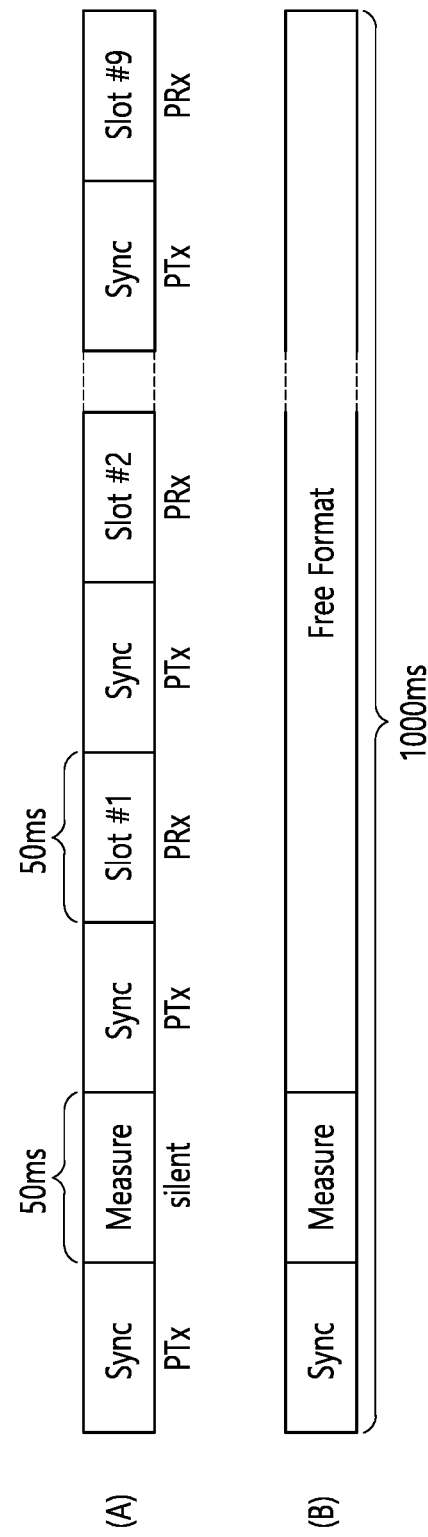
FIG. 9 shows a communication frame structure according to an exemplary embodiment of the present disclosure.

FIG. 9 shows a communication frame structure according to an exemplary embodiment of the present disclosure. This may correspond to a communication frame structure in a shared mode.

Referring to FIG. 9, in the shared mode, different forms of frames may be used along with one another. For example, in the shared mode, a slotted frame having a plurality of slots, as shown in (A), and a free format frame that does not have a specified format, as shown in (B), may be used. More specifically, the slotted frame corresponds to a frame for transmitting short data packets from the wireless power receiver (200) to the wireless power transmitter (100). And, since the free format frame is not configured of a plurality of slots, the free format frame may correspond to a frame that is capable of performing transmission of long data packets.

Meanwhile, the slotted frame and the free format frame may be referred to other diverse terms by anyone skilled in the art. For example, the slotted frame may be alternatively referred to as a channel frame, and the free format frame may be alternatively referred to as a message frame.

More specifically, the slotted frame may include a sync pattern indicating the starting point (or beginning) of a slot, a measurement slot, nine slots, and additional sync patterns each having the same time interval that precedes each of the nine slots.

Herein, the additional sync pattern corresponds to a sync pattern that is different from the sync pattern that indicates the starting point of the above-described frame. More specifically, the additional sync pattern does not indicate the starting point of the frame but may indicate information related to the neighboring (or adjacent) slots (i.e., two consecutive slots positioned on both sides of the sync pattern).

Among the nine slots, each sync pattern may be positioned between two consecutive slots. In this case, the sync pattern may provide information related to the two consecutive slots.

Additionally, the nine slots and the sync patterns being provided before each of the nine slots may have the same time interval. For example, the nine slots may have a time interval of 50 ms. And, the nine sync patterns may have a time length of 50 ms.

Meanwhile, the free format frame, as shown in (B) may not have a specific format apart from the sync pattern indicating the starting point of the frame and the measurement slot. More specifically, the free format frame is configured to perform a function that is different from that of the slotted frame. For example, the free format frame may be used to perform a function of performing communication of long data packets (e.g., additional owner information packets) between the wireless power transmitter and the wireless power receiver, or, in case of a wireless power transmitter being configured of multiple coils, to perform a function of selecting any one of the coils.

Hereinafter, a sync pattern that is included in each frame will be described in more detail with reference to the accompanying drawings.

FIG. 10 is a structure of a sync pattern according to an exemplary embodiment of the present disclosure.

Referring to FIG. 10, the sync pattern may be configured of a preamble, a start bit, a response field, a type field, an info field, and a parity bit. In FIG. 10, the start bit is illustrated as ZERO.

More specifically, the preamble is configured of consecutive bits, and all of the bits may be set to 0. In other words, the preamble may correspond to bits for matching a time length of the sync pattern.

The number of bits configuring the preamble may be subordinate to the operation frequency so that the length of the sync pattern may be most approximate to 50 ms but within a range that does not exceed 50 ms. For example, in case the operation frequency corresponds to 100 kHz, the sync pattern may be configured of two preamble bits, and, in case the operation frequency corresponds to 105 kHz, the sync pattern may be configured of three preamble bits.

The start bit may correspond to a bit that follows the preamble, and the start bit may indicate ZERO. The ZERO may correspond to a bit that indicates a type of the sync pattern. Herein, the type of sync patterns may include a frame sync including information that is related to a frame, and a slot sync including information of the slot. More specifically, the sync pattern may be positioned between consecutive frames and may correspond to a frame sync that indicate a start of the frame, or the sync pattern may be positioned between consecutive slots among a plurality of slots configuring the frame and may correspond to a sync slot including information related to the consecutive slots.

For example, in case the ZERO is equal to 0, this may indicate that the corresponding slot is a slot sync that is positioned in-between slots. And, in case the ZERO is equal to 1, this may indicate that the corresponding sync pattern is a frame sync being located in-between frames.

A parity bit corresponds to a last bit of the sync pattern, and the parity bit may indicate information on a number of bits configuring the data fields (i.e., the response field, the type field, and the info field) that are included in the sync pattern. For example, in case the number of bits configuring the data fields of the sync pattern corresponds to an even number, the parity bit may be set to when, and, otherwise (i.e., in case the number of bits corresponds to an odd number), the parity bit may be set to 0.

The response field may include response information of the wireless power transmitter for its communication with the wireless power receiver within a slot prior to the sync pattern. For example, in case a communication between the wireless power transmitter and the wireless power receiver is not detected, the response field may have a value of '00'. Additionally, if a communication error is detected in the communication between the wireless power transmitter and the wireless power receiver, the response field may have a value of '01'. The communication error corresponds to a case where two or more wireless power receivers attempt to access one slot, thereby causing collision to occur between the two or more wireless power receivers.

Additionally, the response field may include information indicating whether or not the data packet has been accurately received from the wireless power receiver. More specifically, in case the wireless power transmitter has denied the data packet, the response field may have a value of "10" (10—not acknowledge (NAK)). And, in case the wireless power transmitter has confirmed the data packet, the response field may have a value of "11" (11—acknowledge (ACK)).

The type field may indicate the type of the sync pattern. More specifically, in case the sync pattern corresponds to a first sync pattern of the frame (i.e., as the first sync pattern, in case the sync pattern is positioned before the measurement slot), the type field may have a value of '1', which indicates a frame sync.

Additionally, in a slotted frame, in case the sync pattern does not correspond to the first sync pattern of the frame, the type field may have a value of '0', which indicates a slot sync.

Moreover, the information field may determine the meaning of its value in accordance with the sync pattern type, which is indicated in the type field. For example, in case the type field is equal to 1 (i.e., in case the sync pattern type indicates a frame sync), the meaning of the information field may indicate the frame type. More specifically, the information field may indicate whether the current frame corresponds to a slotted frame or a free-format frame. For example, in case the information field is given a value of '00', this indicates that the current frame corresponds to a slotted frame. And, in case the information field is given a value of '01', this indicates that the current frame corresponds to a free-format frame.

Conversely, in case the type field is equal to 0 (i.e., in case the sync pattern type indicates a slot sync), the information field may indicate a state of a next slot, which is positioned after the sync pattern. More specifically, in case the next slot corresponds to a slot that is allocated (or assigned) to a specific wireless power receiver, the information field is given a value of '00'. In case the next slot corresponds to a slot that is locked, so as to be temporarily used by the specific wireless power receiver, the information field is given a value of '01'. Alternatively, in case the next slot corresponds to a slot that may be freely used by a random wireless power receiver, the information field is given a value of '10'.

Figure 11:
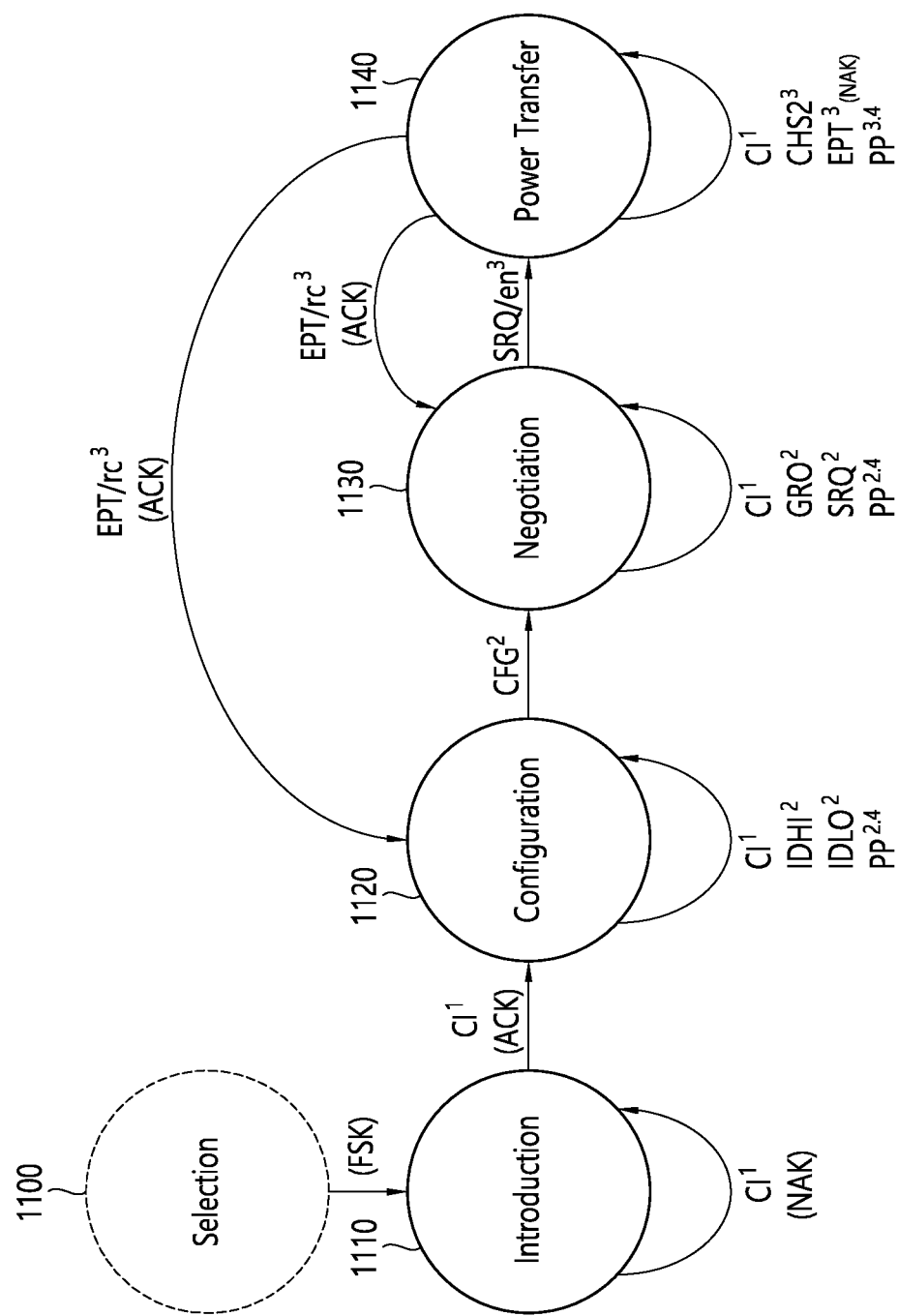
FIG. 11 shows operation statuses of a wireless power transmitter and a wireless power receiver in a shared mode according to an exemplary embodiment of the present disclosure.

FIG. 11 shows operation statuses of a wireless power transmitter and a wireless power receiver in a shared mode according to an exemplary embodiment of the present disclosure.

Referring to FIG. 11, the wireless power receiver operating in the shared mode may be operated in any one of a selection phase (1100), an introduction phase (1110), a configuration phase (1120), a negotiation phase (1130), and a power transfer phase (1140).

Firstly, the wireless power transmitter according to the exemplary embodiment of the present disclosure may transmit a wireless power signal in order to detect the wireless power receiver. More specifically, a process of detecting a wireless power receiver by using the wireless power signal may be referred to as an Analog ping.

Meanwhile, the wireless power receiver that has received the wireless power signal may enter the selection phase (1100). As described above, the wireless power receiver that has entered the selection phase (1100) may detect the presence or absence of an FSK signal within the wireless power signal.

In other words, the wireless power receiver may perform communication by using any one of an exclusive mode and a shared mode in accordance with the presence or absence of the FSK signal.

More specifically, in case the FSK signal is included in the wireless power signal, the wireless power receiver may operate in the shared mode, and, otherwise, the wireless power receiver may operate in the exclusive mode.

In case the wireless power receiver operates in the shared mode, the wireless power receiver may enter the introduction phase (1110). In the introduction phase (1110), the wireless power receiver may transmit a control information (CI) packet to the wireless power transmitter in order to transmit the control information packet during the configuration phase, the negotiation phase, and the power transfer phase. The control information packet may have a header and information related to control. For example, in the control information packet, the header may correspond to 0X53.

In the introduction phase (1110), the wireless power receiver performs an attempt to request a free slot for transmitting the control information (CI) packet during the following configuration phase, negotiation phase, and power transfer phase. At this point, the wireless power receiver selects a free slot and transmits an initial CI packet. If the wireless power transmitter transmits an ACK as a response to the corresponding CI packet, the wireless power receiver enters the configuration phase. If the wireless power transmitter transmits a NAK as a response to the corresponding CI packet, this indicates that another wireless power receiver is performing communication through the configuration and negotiation phase. In this case, the wireless power receiver re-attempts to perform a request for a free slot.

If the wireless power receiver receives an ACK as a response to the CI packet, the wireless power receiver may determine the position of a private slot within the frame by counting the remaining sync slots up to the initial frame sync. In all of the subsequent slot-based frames, the wireless power receiver transmits the CI packet through the corresponding slot.

If the wireless power transmitter authorizes the entry of the wireless power receiver to the configuration phase, the wireless power transmitter provides a locked slot series for the exclusive usage of the wireless power receiver. This may ensure the wireless power receiver to proceed to the configuration phase without any collision.

The wireless power receiver transmits sequences of data packets, such as two identification data packets (IDHI and IDLO), by using the locked slots. When this phase is completed, the wireless power receiver enters the negotiation phase. During the negotiation state, the wireless power transmitter continues to provide the locked slots for the exclusive usage of the wireless power receiver. This may ensure the wireless power receiver to proceed to the negotiation phase without any collision.

The wireless power receiver transmits one or more negotiation data packets by using the corresponding locked slot, and the transmitted negotiation data packet(s) may be mixed with the private data packets. Eventually, the corresponding sequence is ended (or completed) along with a specific request (SRQ) packet. When the corresponding sequence is completed, the wireless power receiver enters the power transfer phase, and the wireless power transmitter stops the provision of the locked slots.

In the power transfer phase, the wireless power receiver performs the transmission of a CI packet by using the allocated slots and then receives the power. The wireless power receiver may include a regulator circuit. The regulator circuit may be included in a communication/control circuit. The wireless power receiver may self-regulate a reflected impedance of the wireless power receiver through the regulator circuit. In other words, the wireless power receiver may adjust the impedance that is being reflected for an amount of power that is requested by an external load. This may prevent an excessive reception of power and overheating.

In the shared mode, (depending upon the operation mode) since the wireless power transmitter may not perform the adjustment of power as a response to the received CI packet, in this case, control may be needed in order to prevent an overvoltage state.

A wireless power transfer system may be equipped with a message exchange function in an application layer in order to support extension to various application fields. Based on the above-described function, information related to authentication of a device or messages of other application levels may be transmitted (or transferred)/received between a wireless power transferring device and receiving device. As described above, in order to enable messages to be transmitted (or transferred) between a wireless power transferring device and a wireless power receiving device, a separate hierarchical architecture for data transmission (or data transfer) is being required, and a method for efficiently managing and operating the hierarchical architecture is also being required.

BLE Communication Connection Using a Random Address

The present embodiment discloses a method for performing a handover procedure by using a random address in the wireless power transfer system.

The present embodiment discloses an advertising method when Bluetooth Low Energy (BLE) communication is being used by the wireless power transfer system.

In the present specification, although a Qi standard of WPC is given as an example of a standard technology, the technical spirit of the present disclosure includes embodiments of authentication based on not only the Qi standard but also other standards.

In order to establish BLE communication between the wireless power transferring device and the wireless power receiving device, a MAC address that is needed for BLE connection may be transferred or received via in-band communication, and the BLE connection may be attempted by using the MAC address. However, since a fixed address, such as a MAC address or BLE device address, is a unique address of the corresponding device, this does not show excellent performance in the aspect of security.

Therefore, the wireless power transferring device and the wireless power receiving device according to the present embodiment may establish a safer BLE connection by using a random address, instead of using a fixed BLE device address. For this, the wireless power transferring device or wireless power receiving device according to the present embodiment may replace the BLE device address with a random address, so as to perform an operation pf configuring an advertising packet (or advertisement packet). A central device receives a random address via in-band communication and, then, renews an address to which pairing is to be attempted, when receiving an advertising packet. Herein, the central device may be a wireless power transferring device or wireless power receiving device. The present embodiment specifies a method for transferring an address by using in-band communication in a Handover phase.

Figure 12:
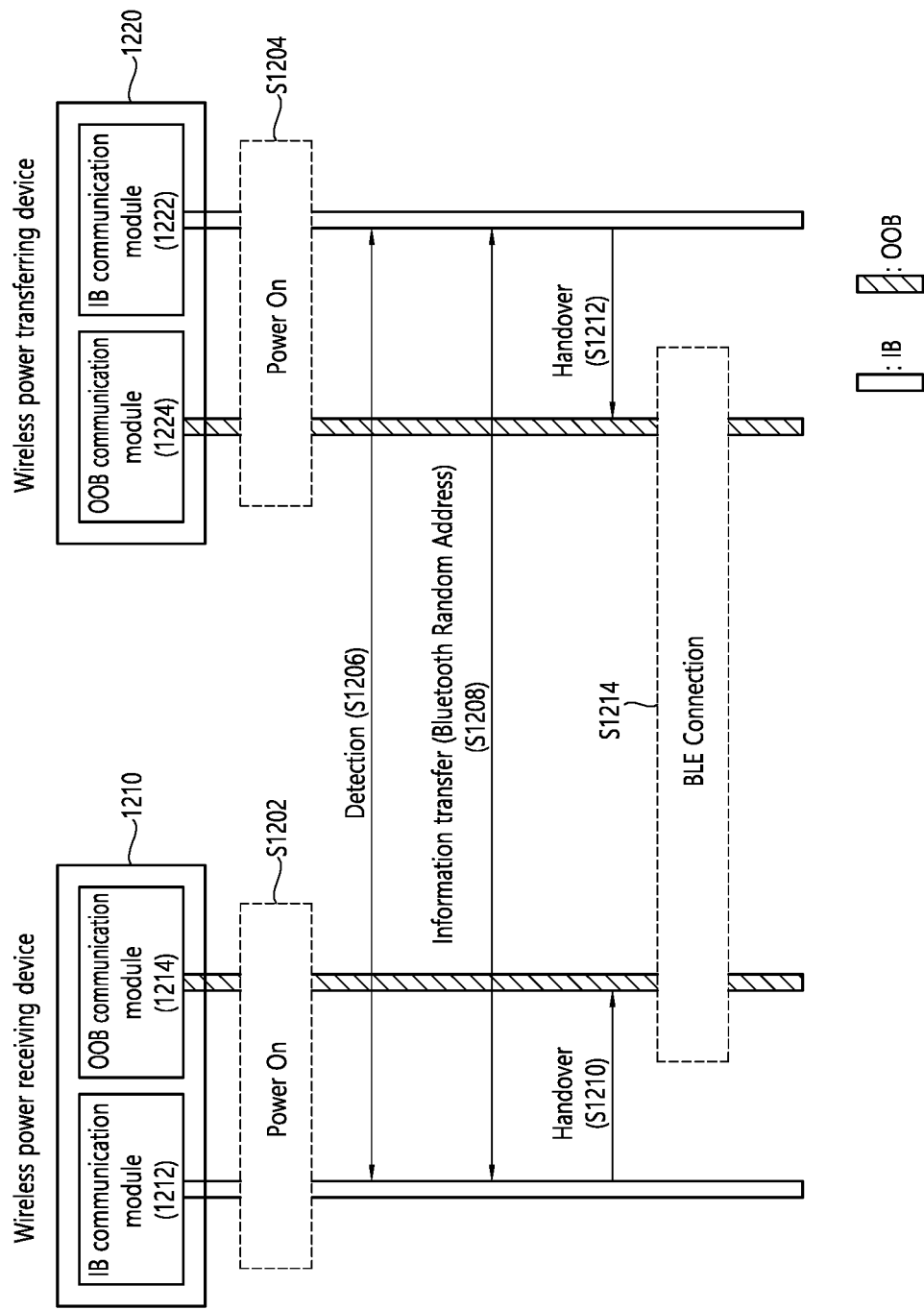
FIG. 12 is a flow chart showing a BLE connection procedure between a wireless power transferring device and a wireless power receiving device according to an embodiment of the present disclosure.

FIG. 12 is a flow chart showing a BLE connection procedure between a wireless power transferring device and a wireless power receiving device according to an embodiment of the present disclosure.

Referring to FIG. 12, a wireless power receiving device (1210) and a wireless power transferring device (1220) may each be equipped with an in-band communication module (1212, 1222) and an out-of-band (OOB) communication module (or BLE communication module) (1214, 1224). In the present specification, in-band communication, which is established in an operation frequency domain by using the in-band communication module (1212, 1222), is expressed as a white operation flow region, an out-of-band (OOB) communication, which is established in another frequency domain by using the OOB communication module (1214, 1224), is expressed as an operation flow region marked with slanted lines.

Each of the wireless power receiving device (1210) and the wireless power transferring device (1220) first turns on power so that the device can maintain its operating state (S1102, S1104). Thereafter, object detection is performed by using the in-band communication module (1212, 1222) of the wireless power receiving device (1210) and a wireless power transferring device (1220) (S1206). Herein, object detection is an operation that detects whether or not an object related to wireless charging exists in a neighboring region by using an operation frequency of wireless charging. Therefore, by performing the corresponding process, the wireless power receiving device (1210) and the wireless power transferring device (1220) recognizes each other's presence.

After the wireless power transferring device (1220) completes the object detection between the wireless power transferring device (1220) and the wireless power receiving device (1210) (S1206), delivery of information related to a BLE random address may be performed between the wireless power receiving device (1210) and the wireless power transferring device (1220). At this point, a communication packet that is being used for the information delivery (or transfer) process may be the same as the communication packet of FIG. 14 (see FIG. 14).

If the BLE random address is successfully exchanged between the two devices, each of the wireless power transferring device (1220) and the wireless power receiving device (1210) performs handover from in-band communication to BLE communication (or OOB communication) by using the BLE random address (S1210, S1212). After the handover is carried out, a procedure related to wireless power charging and a delivery of information that is needed in the corresponding procedure are carried out via BLE communication.

That is, after the handover, the wireless power transferring device (1220) and the wireless power receiving device (1210) initiate BLE connection and establishes connection based on at least one of the BLE random address respectively received by each device via in-band communication (S1214).

According to the present embodiment, a random address is renewed at each BLE connection and then transferred by using in-band communication. Therefore, the BLE connection is carried out after performing information delivery (or transfer) via in-band communication.

The above-described wireless power transferring device according to the embodiment of FIG. 12 corresponds to the wireless power transferring device or wireless power transmitter or power transferring unit shown in FIG. 1 to FIG. 11. Therefore, operations of the wireless power transferring device according to the present embodiment are embodied by one of the components of the wireless power transferring device of FIG. 1 to FIG. 11, or by a combination of two or more of the above-mentioned components. For example, in-band communication, BLE communication, BLE information delivery, operations of processing, transferring, and receiving a communication packet including a random address, which are performed by the wireless power transferring device, may be performed by a communication/control circuit (120). The above-described wireless power receiving device according to the embodiment of FIG. 12 corresponds to the wireless power receiving device or wireless power receiver or power receiving unit shown in FIG. 1 to FIG. 11. Therefore, operations of the wireless power receiving device according to the present embodiment are embodied by one of the components of the wireless power receiving device of FIG. 1 to FIG. 11, or by a combination of two or more of the above-mentioned components. For example, in-band communication, BLE communication, BLE information delivery, operations of processing, transferring, and receiving a communication packet including a random address, which are performed by the wireless power receiving device, may be performed by a communication/control circuit (220).

Figure 13A:
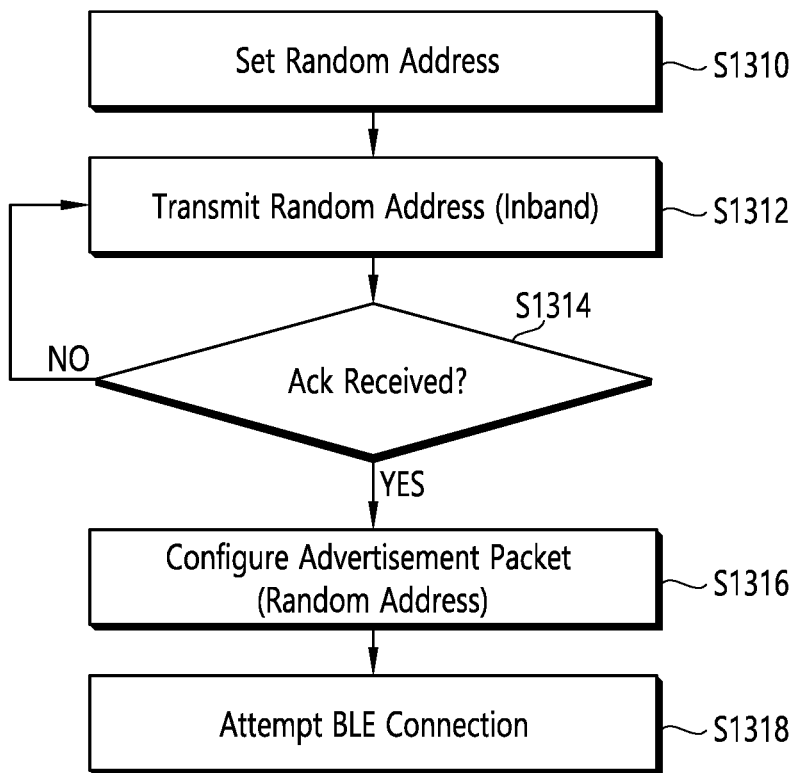
FIG. 13a and FIG. 13b are flow charts each showing a BLE connection procedure through random address transfer/reception of a wireless power transferring device and a wireless power receiving device according to an embodiment of the present disclosure.
Figure 13B:
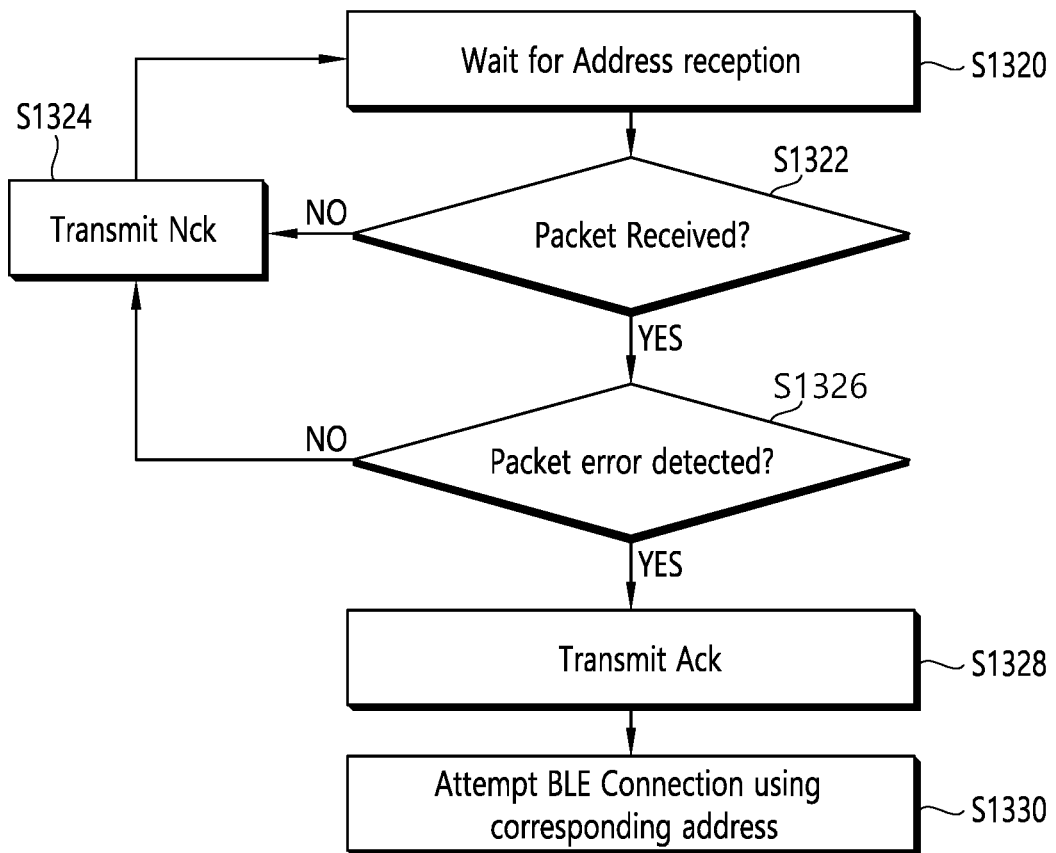

FIG. 13*a* and FIG. 13*b* are flow charts each showing a BLE connection procedure through random address transfer/reception of a wireless power transferring device and a wireless power receiving device according to an embodiment of the present disclosure. The present embodiment assumes an embodiment, wherein the wireless power receiving device first generates a random address and then delivers the random address to the wireless power transferring device. Although the present embodiment assumes the above-described situation, the functions and operation order may be interchanged between the wireless power receiving device and the wireless power transferring device.

Referring to FIG. 13a, before establishing BLE communication, the wireless power receiving device configures a random address that is to be used in order to establish BLE communication (S1310). The random address may be derived from a device-specific address, or may be generated as a completely random address (hereinafter, refer to the description on static address, resolvable private address, and non-resolvable private address).

After the wireless power receiving device generates the random address, the wireless power receiving device packetizes the random address and delivers the packetized random address to the wireless power transferring device via in-band communication (S1312). Thereafter, the wireless power receiving device waits for a response from the wireless power transferring device (S1314). At this point, if a predetermined period of time elapses without receiving any response, the wireless power receiving device retransfers (or retransmits) the packet including the random address. Even when an Nck response is received, the wireless power receiving device may retransmit the packet. If the wireless power receiving device receives an Ack response indicating that the packet has been successfully received, within a predetermined period of time, the wireless power receiving device performs handover. The Ack packet may include a random address of the wireless power transferring device. Alternatively, as a counteraction of receiving the packet from the wireless power receiving device, after sending the Ack packet, the wireless power transferring device may separately generate a response packet including its random address and may, then, transmit the separately generated response packet to the wireless power receiving device.

Thereafter, the wireless power receiving device uses an out-of-band (OOB) communication module to configure an Advertising packet (S1316) and to attempt a BLE connection (S1318).

Referring to FIG. 13b, the wireless power transferring device waits for the packet including the random address of the wireless power receiving device generated by the wireless power receiving device (S1320), and, then, when the random address packet arrives from the wireless power receiving device, the wireless power transferring device receives the corresponding packet (S1322). If the reception is not properly performed (S1322), or if an error is detected within the packet (S1326), the wireless power transferring device transfers an Nck to the wireless power receiving device (S1324). If the packet reception has been successfully performed, and if error has not been detected in the corresponding packet, the wireless power transferring device transfers an Ack (S1328). At this point, the wireless power transferring device may include its own random address in the Ack packet, or, after sending the Ack, the wireless power transferring device may transmit a packet including its own random address to the wireless power receiving device, within a predetermined period of time.

Thereafter, after securing the random address of the wireless power receiving device, the wireless power transferring device performs handover from in-band communication to out-of-band (OOB) communication.

After performing the handover, the wireless power transferring device uses the out-of-band communication module so as to attempt a BLE connection by using the random address (S1330).

Figure 14:
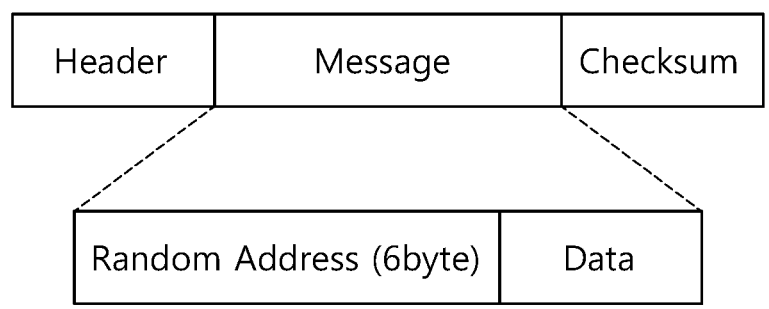
FIG. 14 is a conceptual diagram showing a communication packet structure including a random address according to the present embodiment.

FIG. 14 is a conceptual diagram showing a communication packet structure including a random address according to the present embodiment.

Referring to FIG. 14, before the BLE connection (or connection establishment), a communication packet that is exchanged during the in-band communication may be configured of a header field, a message field, and a checksum field. The header may include index of the corresponding packet, and information on various issues related to properties of the packet, and the checksum field may include a sum value of purposes for examining (or testing) accuracy in data (error detection purpose).

And, the message field may include 6-byte Random Address information. The random address may be a random address that is derived from a device-specific address, or may be a random address that is generated completely randomly (hereinafter, refer to the description on static address, resolvable private address, and non-resolvable private address). In addition to the random address, the message field may further include a data field. The data field may be used in an out-of-band (OOB) connection or in another in-band communication later on.

In the present embodiment, the random address being included in the message field may be renewed at each BLE connection. That is, after the BLE connection with a first device, when a BLE connection is needed with a second device, a random address being delivered to the second device may be a random address of a renewed version after the BLE connection with the first device. Additionally, even when BLE connection is performed multiple times with the same device, after releasing the first BLE connection, a renewed random address may be used when performing a second BLE connection. Herein, however, it is preferable that the random address is first delivered via in-band connection before performing the BLE communication connection and, more specifically, before performing the handover.

Figure 15:
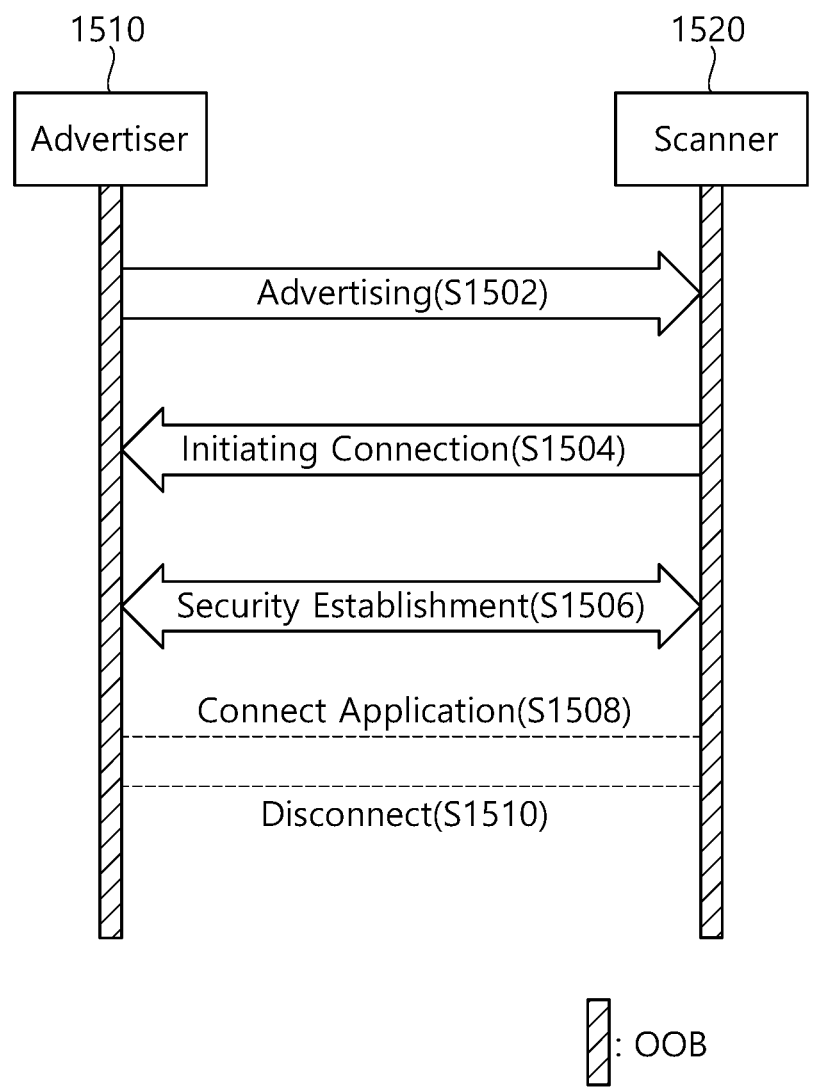
FIG. 15 is a flow chart showing a BLE pairing process between a wireless power transferring device and a wireless power receiving device according to the present embodiment.

FIG. 15 is a flow chart showing a BLE pairing process between a wireless power transferring device and a wireless power receiving device according to the present embodiment. When performing wireless charging based on OOB communication (or BLE communication), information for differentiating (or identifying) the wireless power receiving device that is to be charged may be used. At this point, the information may be included in the advertising packet. Each of the OOB communication modules (or BLE communication modules) being used in the OOB communication carries out a pairing process, as shown in FIG. 15, when being connected to other devices for the first time.

Referring to FIG. 15, an advertiser (1510) performs advertising (S1502). The advertiser (1510) is a device that notifies its presence to its neighboring devices. And, herein, the advertiser (1510) may be a wireless power transferring device or a wireless power receiving device. Advertising is handled by a Link layer of the advertiser (1510). The advertising procedure is a process performed by the advertiser (1510) for notifying its presence to other devices supporting BLE that are located in the neighboring area of the advertiser (1510). The advertiser (1510) advertises its presence to a scanner (1520) at predetermined intervals. Generally, the interval may be 1 second. However, the interval is not mandatorily 1 second. The interval may be set to other time durations, such as 0.1 second, 0.2 second, 0.5 second, 2 seconds, 3 seconds, 5 seconds, 10 seconds, and so on.

Subsequently, the scanner (1520) performs an operation of initiating connection (S1504). Initiating connection is also handled by the Link layer. The initiating connection procedure is a process performed by the scanner (1520) for requesting connection, when the scanner (1520) intends to scan and receive an advertiser packet (or advertising packet) being transferred by the advertiser, and to exchange data after establishing a connection with the advertiser (1510). Herein, the device requesting the connection performs a master role (generally, the scanner (1520) performs this role), and the advertiser (1510) performs a slave role. In order to be synchronized with a frequency hopping sequence of the master, the slave transfers a connection request packet, which is requested by the master, after including frequency hopping channel map information in the requested packet.

Thereafter, the advertiser (1510) and the scanner (1520) perform Security Establishment (S1506). The Security Establishment is handled by a Security Manager. The Security Establishment procedure is a process of performing encryption and authentication in accordance with a security mode, which is configured in a BLE device. The Security Establishment procedure includes pairing, bonding, and encryption re-establishment procedures. In the pairing procedure, the security manager generates a temporary security encryption key in order to establish a security link. The encryption key is maintained while the connection is effective. However, since the encryption key is not stored, it cannot be re-used for another connection. In the bonding procedure, once the pairing process is completed, the security manager stores a shared security key and establishes a security relationship so that the shared security key can be re-used for a next connection. In the encryption re-establishment procedure (or phase), the security manager allows the security key to be stored in both devices, so as to enable security connection to be reconfigured without having to carry out the pairing-bonding procedures, when connection is to be established at a next session.

After the Security Establishment, the OOB communication module of each device performs BLE application connection (S1508), and, then, while the relation communication is maintained, if the device(s) goes/go outside of the BLE communication range, or if the device(s) is/are connection to another device, or if the connection undergoes forced release, the OOB communication modules are disconnected (S1510).

A BLE communication module of a wireless power transferring device or wireless power receiving device may be an advertiser and a scanner, respectively. In case a BLE communication module acting as an advertiser is included in the wireless power transferring device and a BLE communication module acting as a scanner is included in the wireless power receiving device, the operations of the advertiser according to FIG. 15 may be the operations of the wireless power transferring device, and the operations of the scanner according to FIG. 15 may be the operations of the wireless power receiving device. Conversely, in case a BLE communication module acting as an advertiser is included in the wireless power receiving device and a BLE communication module acting as a scanner is included in the wireless power transferring device, the operations of the advertiser according to FIG. 15 may be the operations of the wireless power receiving device, and the operations of the scanner according to FIG. 15 may be the operations of the wireless power transferring device.

The above-described wireless power transferring device according to the embodiment of FIG. 15 corresponds to the wireless power transferring device or wireless power transmitter or power transferring unit shown in FIG. 1 to FIG. 11. Therefore, operations of the wireless power transferring device according to the present embodiment are embodied by one of the components of the wireless power transferring device of FIG. 1 to FIG. 11, or by a combination of two or more of the above-mentioned components. For example, processing, transferring, and receiving operations of in-band communication, BLE communication, advertising, initiating communication, and security establishment, which are performed by the wireless power transferring device, may be performed by a communication/control circuit (120). The above-described wireless power receiving device according to the embodiment of FIG. 15 corresponds to the wireless power receiving device or wireless power receiver or power receiving unit shown in FIG. 1 to FIG. 11. Therefore, operations of the wireless power receiving device according to the present embodiment are embodied by one of the components of the wireless power receiving device of FIG. 1 to FIG. 11, or by a combination of two or more of the above-mentioned components. For example, processing, transferring, and receiving operations of in-band communication, BLE communication, advertising, initiating communication, and security establishment, which are performed by the wireless power receiving device, may be performed by a communication/control circuit (220).

Figure 16:
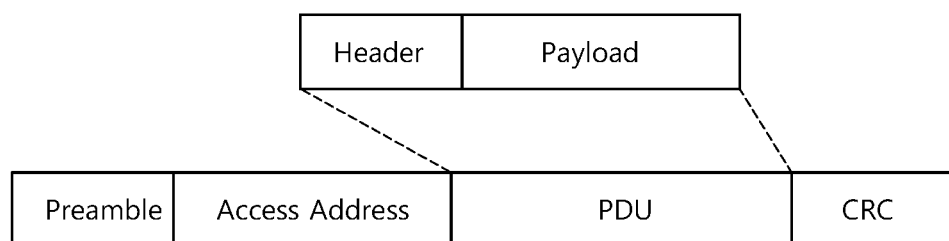
FIG. 16 is a conceptual diagram showing a packet structure being exchanged during a BLE pairing process according to the present embodiment.

FIG. 16 is a conceptual diagram showing a packet structure being exchanged during a BLE pairing process according to the present embodiment.

Referring to FIG. 16, a packet includes a preamble, an access address field, a PDU field, and CRC. At this point, the preamble may be configured of 1 octet or 2 octets. For example, a preamble being transferred or received over BLE 1M of a physical layer may be equal to 1 octet, and a preamble being transferred or received over BLE 2M of a physical layer may be equal to 2 octets.

The access address field is, for example, a 4-octet field, and the access address for all advertising channel packets may be "10001110100010011011111011010110b (0x8E89BED6)".

The CRC is, for example, a 3-octet field, which is used for checking errors in an access address, PDU, and CRC.

The PDU field is, for example, a field being configured of 2 to 257 octets, which includes a header and a payload. According to the present embodiment, in order to include information for differentiating (or identifying) devices being charged during the BLE pairing procedure in an advertising packet, a header and a payload, which are specific information, are added to the PDU field within the packet. The header may indicate the advertising type, and the payload may include the device identifying (or differentiating) information.

If the address between the devices is known by the above-mentioned in-band communication, the advertising type of the header may be configured as ADV_DIRECT_IND, and the payload may be transferred after including an advertiser address (e.g., 6 bytes) and a target device address (e.g., 6 bytes) and data capable of differentiating (or identifying) devices. As described above, ADV_DIRECT_IND indicates a connectable directed advertisement (or is used to send connectable directed advertisement).

Conversely, if the address between the devices is unknown by the above-mentioned in-band communication, the advertising type may be configured as ADV_IND, and the payload may be transferred after including an advertiser address and data capable of differentiating (or identifying) devices. As described above, this indicates a connectable undirected advertisement (or is used to send connectable undirected advertisement). This will be described in more detail later on with reference to FIG. 17.

Figure 17:
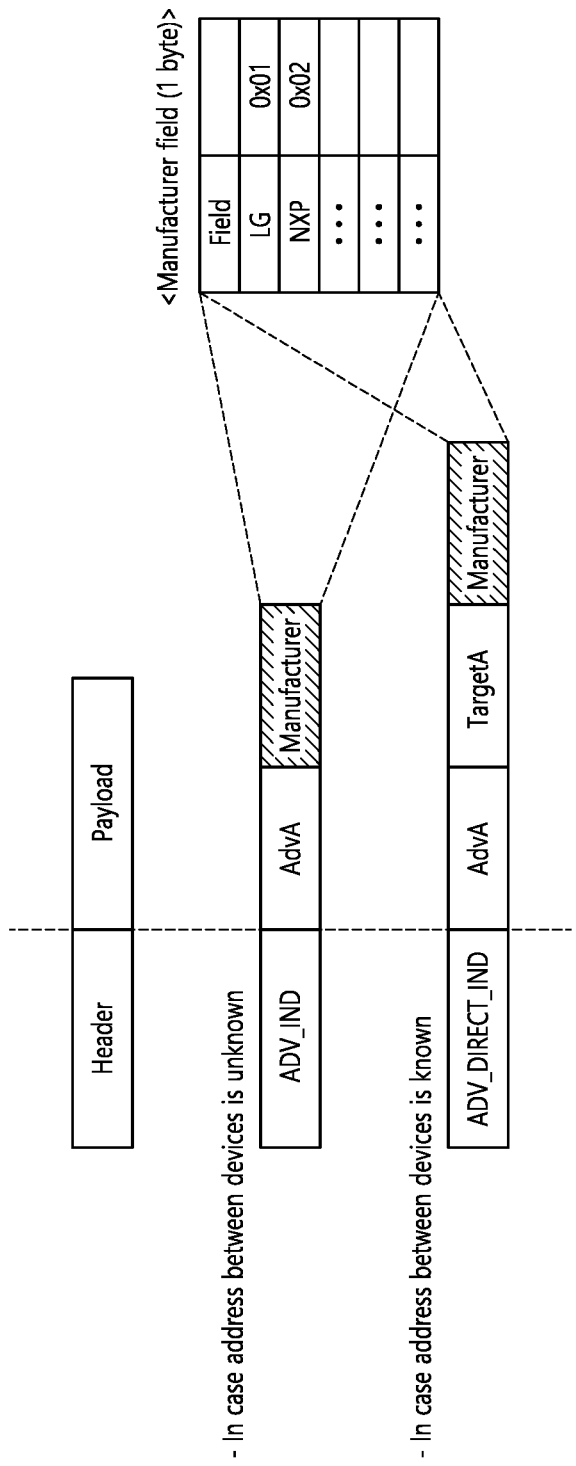
FIG. 17 is a conceptual diagram showing a detailed structure of a PDU part of the packet being exchanged during the BLE pairing process according to the present embodiment.

FIG. 17 is a conceptual diagram showing a detailed structure of a PDU part of the packet being exchanged during the BLE pairing process according to the present embodiment.

Referring to FIG. 17, in case the address between devices is unknown, the header may indicate ADV_IND, and two types of information may be included in the payload. Herein, the two types of information include advertiser address and manufacturer information. Herein, the advertiser address may include a BLE device address, i.e., a MAC address. However, in the present embodiment, in order to reinforce security when performing BLE pairing, a random address may be used instead of the MAC address. The random address may be derived from a device-specific address, or may be generated as a completely random address (hereinafter, refer to the description on static address, resolvable private address, and non-resolvable private address). Additionally, the data capable of differentiating (or identifying) devices may be the manufacturer information. The manufacturer information may be configured of 1 byte, and by sharing manufacturer information corresponding to a specific index, which is indicated in a table format, among the devices, so as to receive and send the index value from one device to another, and vice versa, each of the device may identify one device and/or from another, thereby allowing the corresponding information to be recognized by each device. At this point, a packet may have a maximum length of 31 bytes.

In case the address between the devices is known via in-band communication, the header may indicate ADV_DIRECT_IND, and three types of information may be included in the payload. Herein, the three types of information include advertiser address, target device address, and manufacturer information. That is, unlike when the address between devices is unknown, the advertising packet may be generated by further including the target device address information. The target device address information may include a BLE device address, i.e., a MAC address, of a scanner. However, in the present embodiment, in order to reinforce security when performing BLE pairing, a random address of a scanner may be used.

In the present embodiment, handover is initiated when a packet carrying a random address is received via in-band communication. That is, in the wireless power transfer (or transmission) procedure of FIG. 5, regardless of the phase, handover occurs in a phase where a random address packet is being received, and, after the handover is performed, information delivery (or transfer) that is needed in each phase is carried out via out-of-band communication. For example, if a packet carrying a random address is received during a negotiation phase (540), handover is performed in the corresponding phase, and, then, the negotiation phase is resumed after the handover process. Thereafter, the information delivery process may be performed during the negotiation, amendment, power transfer, and renegotiation phases via out-of-band communication.

BLE Communication Connection Using a White List

The present embodiment relates to a method of setting up OOB communication by using a white list in order to prevent cross-connection and establish safe OOB communication. A link layer of the wireless power receiving device or wireless power transferring device may perform device filtering while managing and maintaining a white list. By performing device filtering, the link manager may be limited to respond only to a specific device set (i.e., white list). That is, any transfer (or transmission) or request from devices that are not included in the white list shall be ignored (or disregarded). Herein, a white list is used as an opposite meaning of the term black list, which is a list of surveillance targets or targets having limited rights. That is, white list refers to a list of targets having authorized access by releasing restrictions or conditions, and so on. That is, information related to a reliable device (an address, and so on, of a device that was safely connected may be included herein) may be included in a white list.

For example, device filtering includes operations of responding only to a MAC address device within the white list and not responding to MAC address devices not included in the white list (i.e., advertiser, scanner, initiator, and so on). Device filtering may be performed or managed under a specific rule, which is defined in each phase (or procedure), such as Advertising, Scanning, and Initiating connection. In the present embodiment, the white list may be renewed and managed not only by the MAC address but also by a random address. Herein, if the random address is a static private address and a non-resolvable private address, it shall be difficult to verify the actual address through the random address. Therefore, in this case, the corresponding random address may be included in the white list for a duration during which a random address is maintained (e.g., specific power cycle). And, accordingly, the corresponding random address may receive various privileges of a white list device. Alternatively, when generating a random address, by controlling the generation of the random address so that the corresponding random address can be generated as an address having a rule that is manageable by the white list, the rule being an agreement between the devices, after renewing the white list through the corresponding random address, the corresponding random address may receive various privileges of a white list device. In case of a resolvable private address, a MAC address is derived from a random address by using a known key and a hash value, and the white list may be renewed and managed by using the derived MAC address.

Firstly, an advertising filtering rule defines a method of processing scanning and connection requests, by a link layer of an advertiser. For example, the link layer of an advertiser only processes the scanning request and the connection request from the devices listed in the white list. In another example, the link layer of an advertiser processes the scanning request of all devices. However, in case of a connection request, the link layer of the advertiser processes only the connection requests made by the devices included in the white list. In yet another example, the link layer of an advertiser processes the connection request of all devices. However, in case of a scanning request, the link layer of the advertiser processes only the scanning requests made by the devices included in the white list.

Thereafter, a scanner filtering rule defines a method of processing an advertising packet, by a link layer of a scanner. For example, the link layer of a scanner processes only the advertising packets received from devices within the white list.

Finally, an initiator filtering rule defines a method of processing an advertising packet, by a link layer of an initiator. For example, the link layer of an initiator processes only the connectable advertising packets received from devices within the white list.

Meanwhile, a privacy function of Bluetooth low energy (BLE) allows a device to hide its actual address. In this case, the device may perform communication by using a random address instead of its actual address. As described above, the random address may change over a period of time. Most particularly, a random address may be newly configured for each BLE connection. The random address may include two different types of addresses as described below.

(1) Static Address

After each power cycle, the device may perform (or select) an operation of initializing its static address to a new value. However, the device cannot change its static address during a power cycle.

Basically, a public device address, and not a random address, may be configured of 3 bytes of a manufacturer (or company) assigned address (company_assigned) and 3 bytes of a manufacturer (or company) ID. Conversely, a static address of a random address may be configured of a total of 6 bytes including a 46-bit random part and "1", and an additional "1". Alternatively, the static address may also be configured of a 48-bit random part.

(2) Private Address

A private address includes a non-resolvable private address and a resolvable private address.

In relation to a non-resolvable private address, a peer device cannot discover an actual address. A non-resolvable private address of a random address is configured of a total of 6 bytes including a 46-bit random part and "1", and an additional "1". Alternatively, the non-resolvable private address may also be configured of a 48-bit random part.

In relation to a resolvable private address, a peer device may derive an actual address by using a random address and/or a link key of a connection. A resolvable private address of a random address is configured of a total of 6 bytes including a 24-bit hash part, a 22-bit prand part, "1", and an additional "1".

Although the present embodiment uses both static address and private addresses, preferably, in light of security, it may be more appropriate to use the static address.

Figure 18:
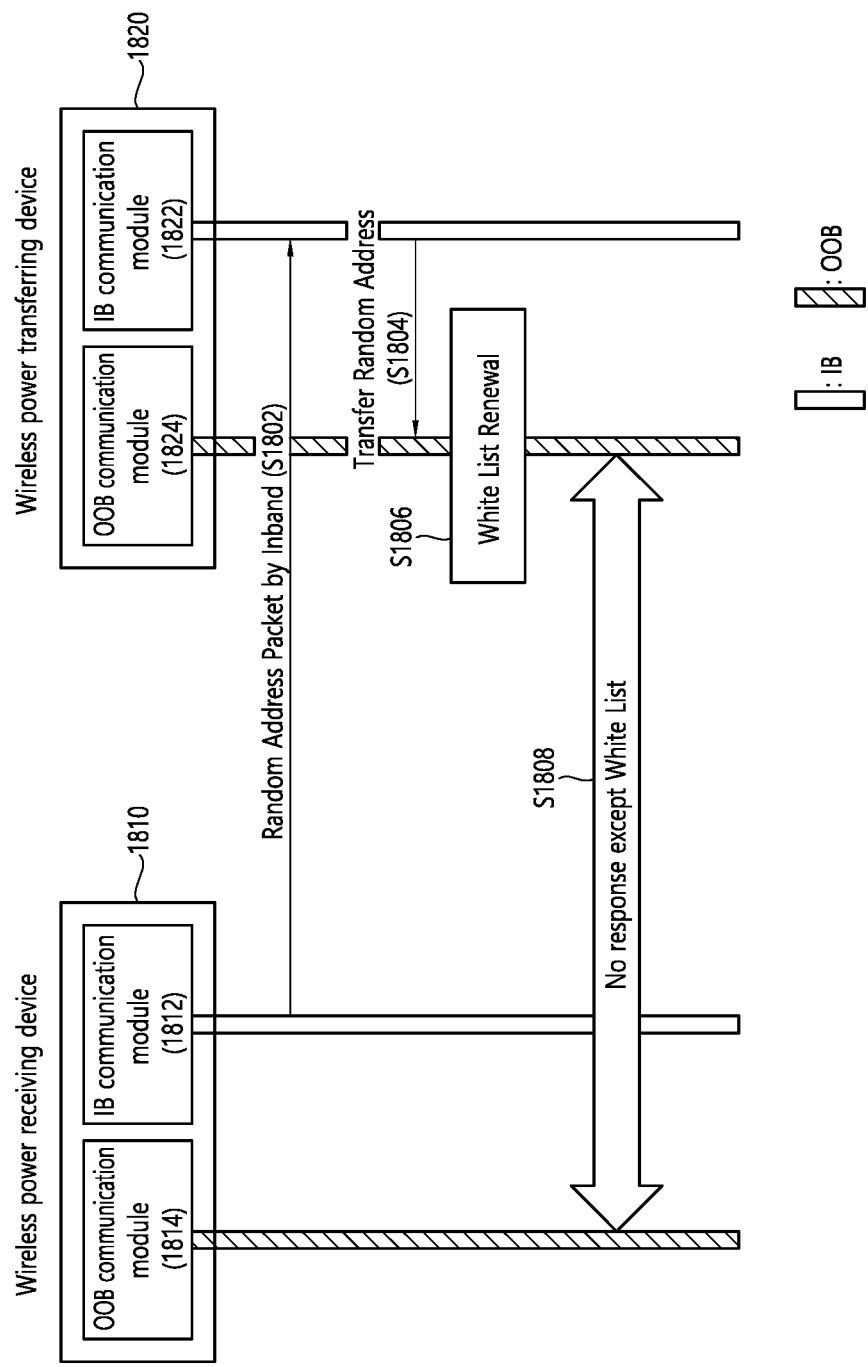
FIG. 18 is a flow chart of an operation for performing BLE connection based on a white list between a wireless power transferring device and a wireless power receiving device according to an example of the present disclosure.

FIG. 18 is a flow chart of an operation for performing BLE connection based on a white list between a wireless power transferring device and a wireless power receiving device according to an example of the present disclosure.

Referring to FIG. 18, a wireless power receiving device (1810) and a wireless power transferring device (1820) may each be equipped with an in-band communication module (1812, 1822) and an out-of-band (OOB) communication module (1814, 1824). As described above, the in-band communication module (1812, 1822) may transmit or receive a packet based on a coil in an operating frequency domain. The out-of-band (OOB) communication module (1814, 1824) may be a BLE communication module.

The in-band communication module (1812) of the wireless power receiving device (1810) transfers a random address packet by using in-band communication (Random Address Packet by In-band) (S1802).

The in-band communication module (1822) of the wireless power transferring device (1820) transfers (or delivers) a random address within the random address packet received from the wireless power receiving device (1810) to the out-of-band (OOB) communication module (1824) (Transfer Random Address) (S1804). Thereafter, the out-of-band (OOB) communication module (1824) of the wireless power transferring device (1820) renews the white list with the transferred (or delivered) random address (White List Renewal) (S1806).

The out-of-band (OOB) communication module (1824) of the wireless power transferring device (1820) transfers a response signal to the wireless power receiving device (1810) only in a case where the wireless power receiving device (1810) is included in the white list (No response except White List) (S1808). If the wireless power receiving device (1810) is not included in the white list, the out-of-band (OOB) communication module (1824) of the wireless power transferring device (1820) does not transmit any response signal.

Figure 19:
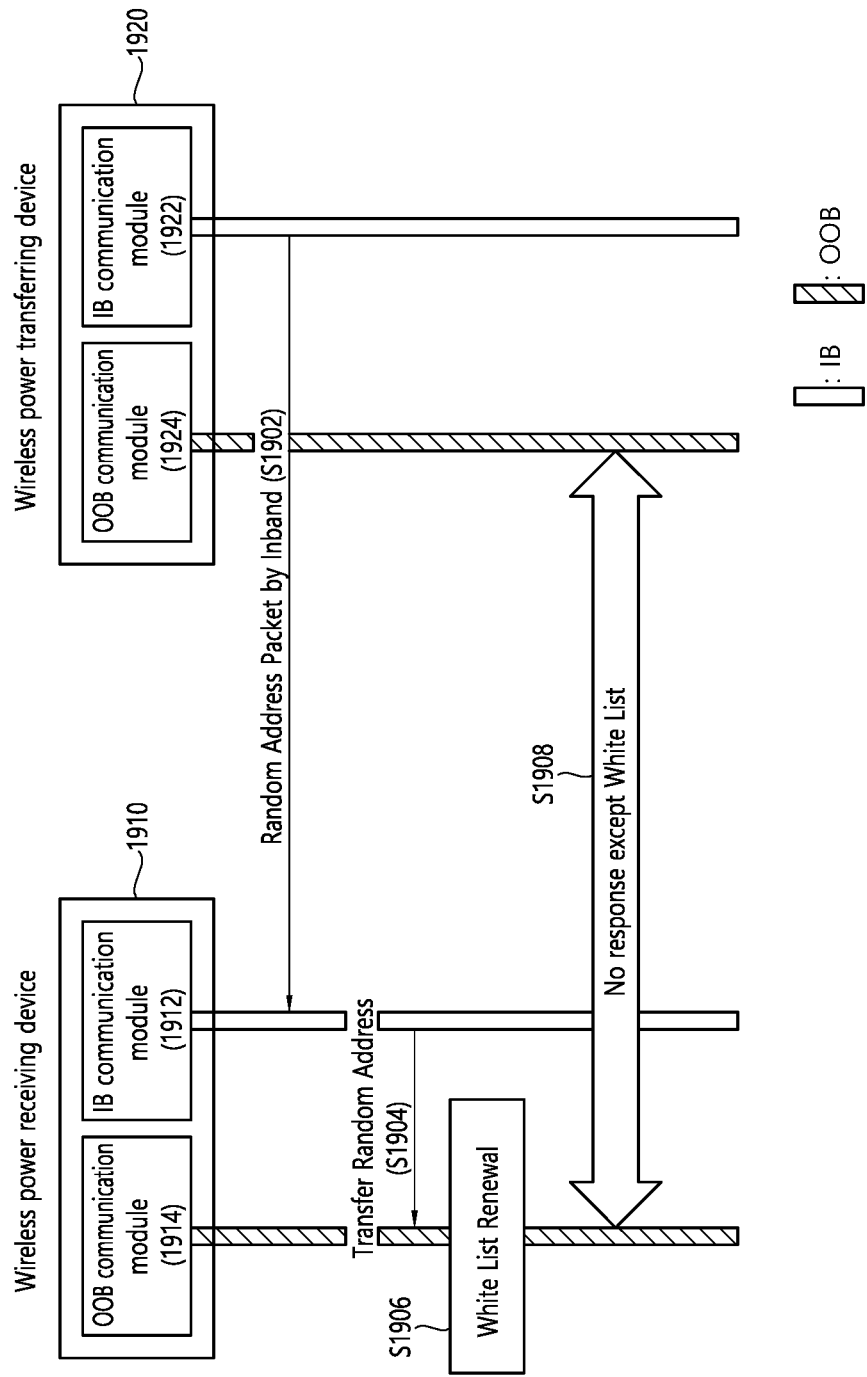
FIG. 19 is a flow chart of an operation for performing BLE connection based on a white list between a wireless power transferring device and a wireless power receiving device according to another example of the present disclosure.

FIG. 19 is a flow chart of an operation for performing BLE connection based on a white list between a wireless power transferring device and a wireless power receiving device according to another example of the present disclosure. According to the present embodiment, the wireless power receiving device establishes connection only with a device (i.e., the wireless power transferring device) existing in the white list.

Referring to FIG. 19, the in-band communication module (1922) of the wireless power transferring device (1920) transfers a random address packet to the wireless power receiving device by using in-band communication (Random Address Packet by In-band) (S1902).

The in-band communication module (1914) of the wireless power receiving device (1910) transfers (or delivers) a random address within the random address packet received from the wireless power transferring device (1920) to the out-of-band (OOB) communication module (1914) (Transfer Random Address) (S1904). Thereafter, the out-of-band (OOB) communication module (1914) of the wireless power receiving device (1910) renews the white list with the transferred (or delivered) random address (White List Renewal) (S1906).

The out-of-band (OOB) communication module (1914) of the wireless power receiving device (1910) transfers a response signal to the wireless power transferring device (1920) only in a case where the wireless power transferring device (1920) is included in the white list (No response except White List) (S1908) If the wireless power transferring device (1920) is not included in the white list, the out-of-band (OOB) communication module (1914) of the wireless power receiving device (1910) does not transmit any response signal. As described above, the wireless power receiving device (1910) takes the lead in managing the white list of the wireless power transferring device (1920), thereby being capable of preventing cross-connection.

Figure 20:
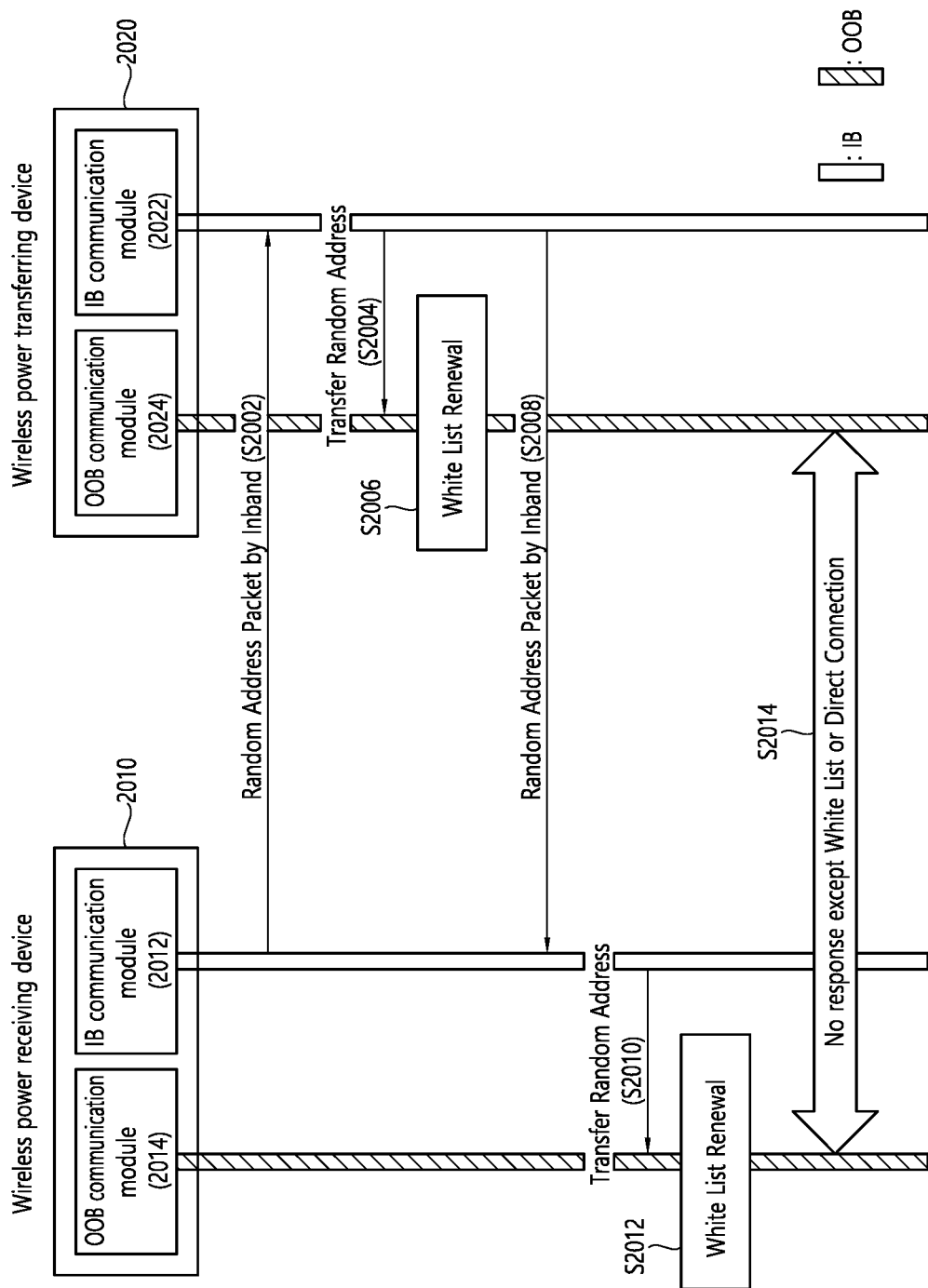
FIG. 20 is a flow chart of an operation for performing BLE connection based on a white list between a wireless power transferring device and a wireless power receiving device according to yet another example of the present disclosure.

FIG. 20 is a flow chart of an operation for performing BLE connection based on a white list between a wireless power transferring device and a wireless power receiving device according to yet another example of the present disclosure.

According to an embodiment, the wireless power transferring device (2020) may establish connection only with devices (i.e., wireless power receiving devices (2010)) that exist in the white list.

According to another embodiment, the wireless power transferring device (2020) may establish connection only with specific peer devices designated by a host and devices (i.e., wireless power receiving devices (2010)) that exist in the white list.

As yet another example, the wireless power receiving device (2010) may establish connection only with devices (i.e., wireless power transferring devices (2020)) that exist in the white list.

Referring to FIG. 20, the in-band communication module (2012) of the wireless power receiving device (2010) transfers a random address packet including its own random address to the in-band communication module (2022) of the wireless power transferring device (2020) by using in-band communication based on an operating frequency (Random Address Packet by In-band) (S2002).

The in-band communication module (2022) of the wireless power transferring device (2020) transfers (or delivers) the received random address to the out-of-band (OOB) communication module (2024) (Transfer Random Address) (S2004). Thereafter, the out-of-band (OOB) communication module (2024) of the wireless power transferring device (2020) renews the white list based on the received random address (S2006).

The wireless power transferring device (2020) may prevent cross-reference by managing the white list related to the wireless power receiving device (2010). The above-mentioned prevention of cross-reference may also be performed together by the wireless power receiving device (2010). That is, the wireless power transferring device (2020) and the wireless power receiving device (2010) may perform cross-check in order to prevent cross-reference.

Hereinafter, a process of preventing cross reference performed by the wireless power receiving device (2010) by managing the white list related to the wireless power transferring device (2020) will be disclosed.

The in-band communication module (2022) of the wireless power transferring device (2020) transfers a random address packet including its own random address to the in-band communication module (2012) of the wireless power receiving device (2010) by using in-band communication based on an operating frequency (Random Address Packet by In-band) (S2008).

The in-band communication module (2012) of the wireless power receiving device (2010) transfers (or delivers) the received random address to the out-of-band (OOB) communication module (2014) (Transfer Random Address) (S2010). Thereafter, the out-of-band (OOB) communication module (2014) of the wireless power receiving device (2010) renews the white list based on the received random address (S2012).

Thereafter, the out-of-band (OOB) communication module (2014, 2024) of each device determines whether or not its counterpart device is included in the white list and then sends a response only in case the counterpart device is included in the white list, so as to directly establish connection, and, otherwise, the out-of-band (OOB) communication module (2014, 2024) does not send any response signal, thereby preventing in advance any unsecure (or unsafe) connection (S2014). That is, BLE connection may be established only in a case where each device knows the address of its counterpart device. Even in a case where only one of the wireless power receiving device (2010) and the wireless power transferring device (2020) is included in the white list, since there exists a device that does not transmit any response signal, direct connection is prevented from being established.

As described above, by performing cross check between one another, the wireless power receiving device and the wireless power transferring device may prevent cross reference, thereby being capable of establishing a more secure BLE communication.

The above-described wireless power transferring device according to the embodiment of FIG. 18 to FIG. 20 corresponds to the wireless power transferring device or wireless power transmitter or power transferring unit shown in FIG. 1 to FIG. 11. Therefore, operations of the wireless power transferring device according to the present embodiment are embodied by one of the components of the wireless power transferring device of FIG. 1 to FIG. 11, or by a combination of two or more of the above-mentioned components. For example, the in-band communication module of the wireless power transferring device according to the present embodiment may be the same as the in-band communication circuit (121) of FIG. 4C or FIG. 4D, and the out-of-band communication module of the wireless power transferring device according to the present embodiment may be the same as the out-of-band communication circuit (122) of FIG. 4C or FIG. 4D.

Additionally, the above-described wireless power receiving device according to the embodiment of FIG. 18 to FIG. 20 corresponds to the wireless power receiving device or wireless power receiver or power receiving unit shown in FIG. 1 to FIG. 11. Therefore, operations of the wireless power receiving device according to the present embodiment are embodied by one of the components of the wireless power receiving device of FIG. 1 to FIG. 11, or by a combination of two or more of the above-mentioned components. For example, the in-band communication module of the wireless power receiving device according to the present embodiment may be the same as the in-band communication circuit (221) of FIG. 4C or FIG. 4D, and the out-of-band communication module of the wireless power receiving device according to the present embodiment may be the same as the out-of-band communication circuit (222) of FIG. 4C or FIG. 4D.

Since the wireless power transmitting method and apparatus or the wireless power receiver and method according to an embodiment of the present disclosure do not necessarily include all the elements or operations, the wireless power transmitter and method and the wireless power transmitter and method may be performed with the above-mentioned components or some or all of the operations. Also, embodiments of the above-described wireless power transmitter and method, or receiving apparatus and method may be performed in combination with each other. Also, each element or operation described above is necessarily performed in the order as described, and an operation described later may be performed prior to an operation described earlier.

The description above is merely illustrating the technical spirit of the present disclosure, and various changes and modifications may be made by those skilled in the art without departing from the essential characteristics of the present disclosure. Therefore, the embodiments of the present disclosure described above may be implemented separately or in combination with each other.

Therefore, the embodiments disclosed in the present disclosure are intended to illustrate rather than limit the scope of the present disclosure, and the scope of the technical spirit of the present disclosure is not limited by these embodiments. The scope of the present disclosure should be construed by claims below, and all technical spirits within a range equivalent to claims should be construed as being included in the right scope of the present disclosure.

What is claimed is:

1. A wireless power receiver, which supports an in-band communication and an out-of-band communication and receives a wireless power from a wireless power transmitter, comprising:
 a power pickup configured to receive the wireless power from the wireless power transmitter; and
 a controller configured to control the reception of the wireless power,
 wherein the wireless power receiver:
 transmits random address information of the out-of-band communication via the in-band communication to the wireless power transmitter,
 transmits an advertisement packet including the random address information, and
 establishes a connection of the out-of-band communication with the wireless power transmitter after transmitting the random address information via the in-band communication and transmitting the advertisement packet.

2. The wireless power receiver of claim 1, wherein the out-of-band communication is a bluetooth low energy (BLE) communication.

3. The wireless power receiver of claim 1, wherein the wireless power receiver is an advertiser.

4. The wireless power receiver of claim 3, wherein the wireless power receiver starts advertising after transmits the random address information via the in-band communication, and
 wherein the wireless power receiver transmits the advertisement packet during the advertising.

5. The wireless power receiver of claim 1, wherein, based on establishing the connection of the out-of-band communication, the wireless power receiver transitions from the in-band communication to the out-of-band communication.

6. The wireless power receiver of claim 1, wherein, in a negotiation phase, the wireless power receiver transmits the random address information of the out-of-band communication via the in-band communication to the wireless power transmitter.

7. A method for receiving a wireless power from a wireless power transmitter, the method performed by a wireless power receiver, which supports an in-band communication and an out-of-band communication, and comprising:
 transmitting random address information of the out-of-band communication via the in-band communication to the wireless power transmitter;
 transmitting an advertisement packet including the random address information; and
 establishing a connection of the out-of-band communication with the wireless power transmitter after transmitting the random address information via the in-band communication and transmitting the advertisement packet.

8. A wireless power transmitter, which supports an in-band communication and an out-of-band communication and transfer a wireless power to a wireless power receiver, comprising:
 a power converter configured to transfer the wireless power to the wireless power receiver; and
 a controller configured to control the transfer of the wireless power,
 wherein the wireless power transmitter:
 receives random address information of the out-of-band communication via the in-band communication from the wireless power receiver,
 receives an advertisement packet including the random address information, and
 establishes a connection of the out-of-band communication with the wireless power receiver after receiving the random address information via the in-band communication and receiving the advertisement packet.

9. The wireless power transmitter of claim 8, wherein the out-of-band communication is a bluetooth low energy (BLE) communication.

10. The wireless power transmitter of claim 8, wherein the wireless power transmitter is a scanner.

11. The wireless power transmitter of claim 10, wherein the wireless power transmitter starts scanning after receiving the random address information via the in-band communication, and
 wherein the wireless power transmitter receives the advertisement packet during the scanning.

12. The wireless power transmitter of claim 8, wherein, based on establishing the connection of the out-of-band communication, the wireless power transmitter transitions from the in-band communication to the out-of-band communication.

13. The wireless power transmitter of claim 8, wherein, in a negotiation phase, the wireless power transmitter receives the random address information of the out-of-band communication via the in-band communication from the wireless power receiver.

* * * * *